US012584466B2

(12) United States Patent
De et al.

(10) Patent No.: US 12,584,466 B2
(45) Date of Patent: Mar. 24, 2026

(54) HYBRID POWER CYCLE FOR 100% CLEAN, AND CONTINUOUS (24X7) HAZARD-FREE LOW-COST POWER GENERATION AND TRANSPORTATION WITHOUT ANY FUEL AND USING ONLY AMBIENT THERMAL ENERGY

(71) Applicants: Dilip Kumar De, Mansfield, TX (US); Idowu Ayodele Oduniyi, Lagos (NG)

(72) Inventors: Dilip Kumar De, Mansfield, TX (US); Idowu Ayodele Oduniyi, Lagos (NG)

(73) Assignee: DILIP KUMAR DE IDOV, Mansfield, TX (US)

( * ) Notice: Subject to any disclaimer, the term of this patent is extended or adjusted under 35 U.S.C. 154(b) by 68 days.

(21) Appl. No.: 18/931,871

(22) Filed: Oct. 30, 2024

(65) Prior Publication Data

US 2025/0052233 A1 Feb. 13, 2025

(51) Int. Cl.
*F03G 7/04* (2006.01)

(52) U.S. Cl.
CPC ..................................... *F03G 7/04* (2013.01)

(58) Field of Classification Search
CPC ..... F03G 7/04; B65D 81/3818; B65D 25/205; B65D 2203/10
See application file for complete search history.

(56) References Cited

U.S. PATENT DOCUMENTS 5,029,444 A * 7/1991 Kalina .................. F01K 25/065
60/649

FOREIGN PATENT DOCUMENTS

EP 3430245 B1 * 6/2022 ............. F01K 23/02
RU 2529917 C2 * 10/2014 ............. F25B 30/04

OTHER PUBLICATIONS

Paul et al.; DE-FC36-01AL67603—Final Report; Dec. 23, 2004; TIAX LLC; (Year: 2004).*
Zhao et al; Directly combining a power cycle and refrigeration cycle: Method and case study; Aug. 5, 2022; hppts://doi.org/10.1016/j.energy.2022.125017. (Year: 2022).*

* cited by examiner

*Primary Examiner* — Emmanuel E Duke

(57) ABSTRACT

A Novel thermodynamic cycle known as the 'Hybrid Power Cycle' is proposed consisting of a power cycle and a refrigeration cycle in a partial form, using fixed amounts of the same working-fluid in closed cycles. The vapor in the partial refrigeration cycle undergoes a polytropic compression with the rejected heat removed by the compressed liquid in the partial power cycle before both are combined at same pressure prior to entering a heat exchanger to absorb ambient heat. When the temperature reaches the desired level, they undergo turbo-expansion yielding a minimum external achievable work of 60.63KJ/kg of liquid nitrogen $(LN_2)$. A novel binary-hybrid cycle was also invented to increase the external work-output to 77.79KJ/kg $(LN_2)$. This technology can be used to generate clean electrical and mechanical power including transportation without any fuel at a low cost, using only ambient heat with zero environmental pollution and zero global warming potential.

20 Claims, 16 Drawing Sheets

34

38

Vapor

36

Liquid

37

35

8

42                                                                                      41

39                                                                                      40

23

TE Power Output

53

54

63

55

62

56

57

9

58

61

59

60

HYBRID POWER CYCLE FOR 100% CLEAN, AND CONTINUOUS (24X7) HAZARD-FREE LOW-COST POWER GENERATION AND TRANSPORTATION WITHOUT ANY FUEL AND USING ONLY AMBIENT THERMAL ENERGY

A Novel thermodynamic cycle 'Hybrid Power Cycle' is proposed consisting of a power cycle and a refrigeration cycle in a partial form, using fixed amounts of the same working-fluid (liquid nitrogen) in closed cycles. The vapor in the partial refrigeration cycle undergoes a polytropic compression with the rejected heat removed by the compressed liquid in the partial power cycle before both are combined at same pressure prior to entering a heat exchanger to absorb ambient heat. When the temperature reaches the desired level, they undergo turbo-expansion yielding a minimum external achievable work of 60.63KJ/kg of liquid nitrogen. A novel binary-hybrid cycle was also invented to increase the external work-output to 77.79KJ/kg of liquid nitrogen. This technology can be used to generate clean electrical and mechanical power including transportation without any fuel at a low cost, using only ambient heat with zero environmental pollution and zero global warming potential.

SPECIFICATIONS

1. Figure Captions

Figure 1:
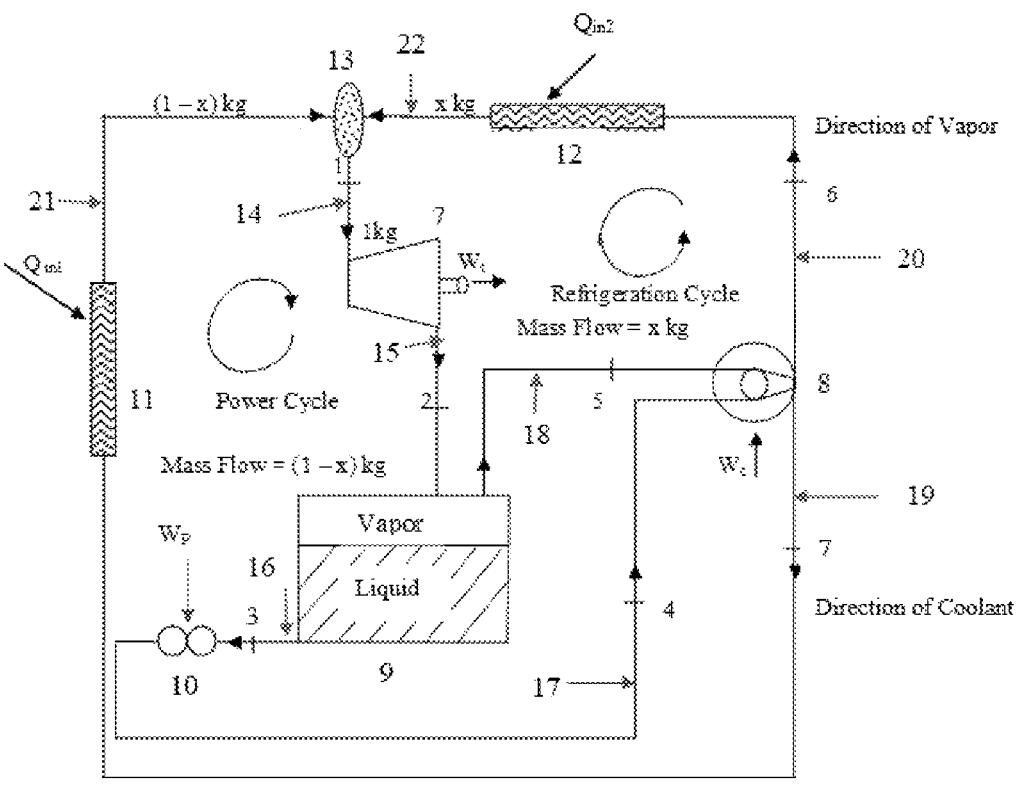

FIG. 1: Schematic of a single Hybrid Power Plant

Figure 2:
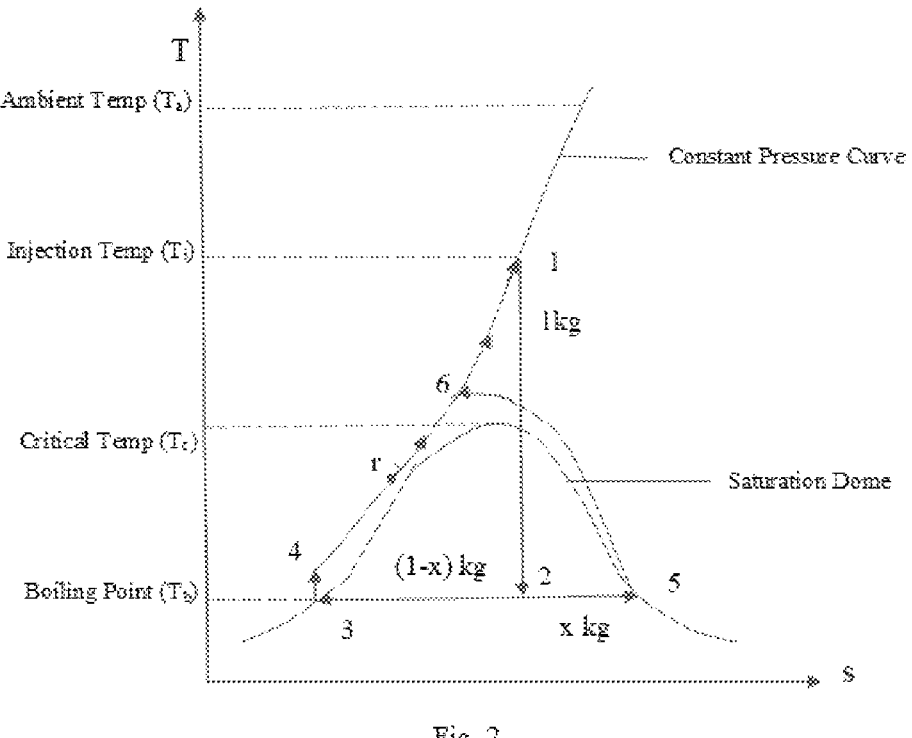

FIG. 2: T–s Diagram of a Simple Hybrid Power Cycle

Figure 3:
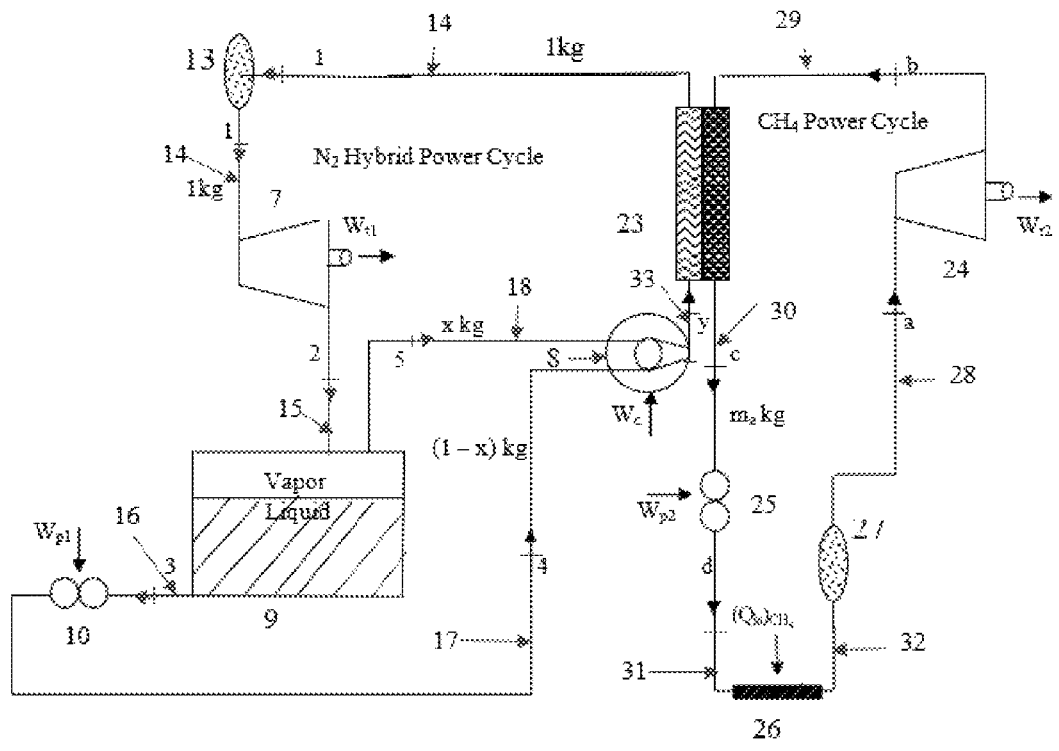

FIG. 3: Schematic of a (LN2-CH4) Binary Hybrid Power Plant

Figure 4:
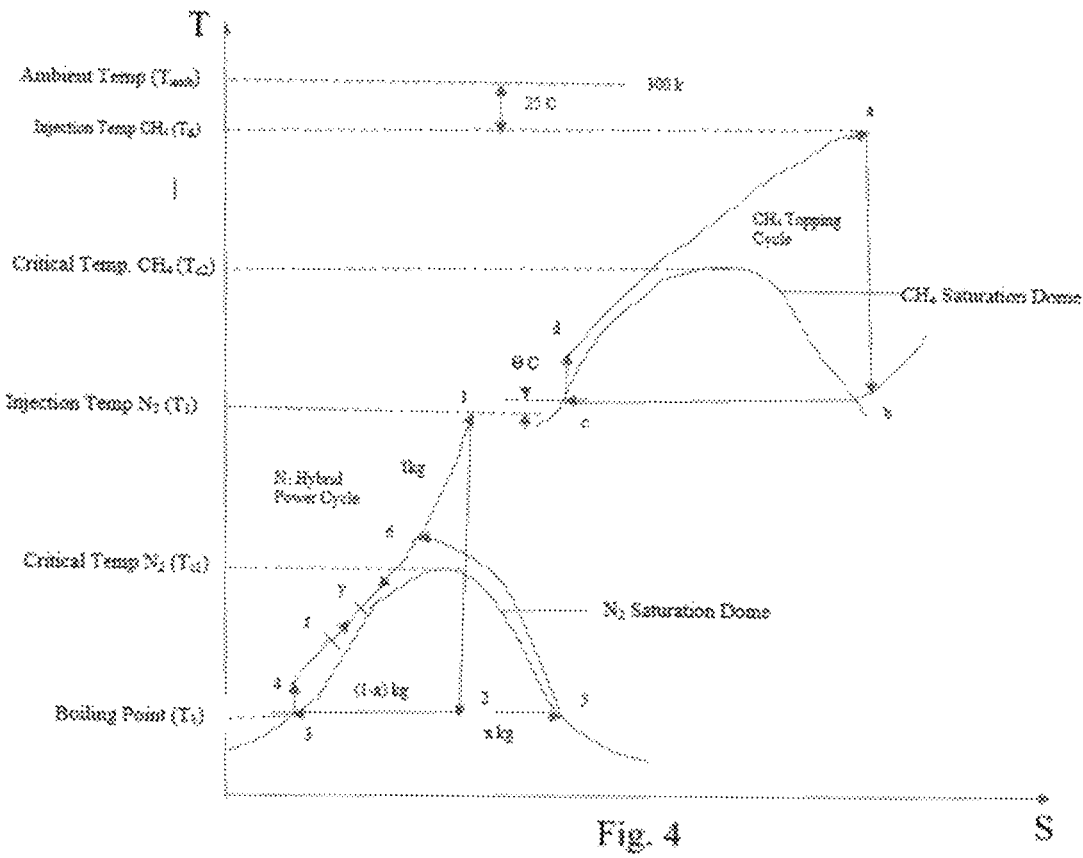

FIG. 4: T–s Diagram of a (LN2-CH4) closed Binary Hybrid Power Cycle

Figure 5:
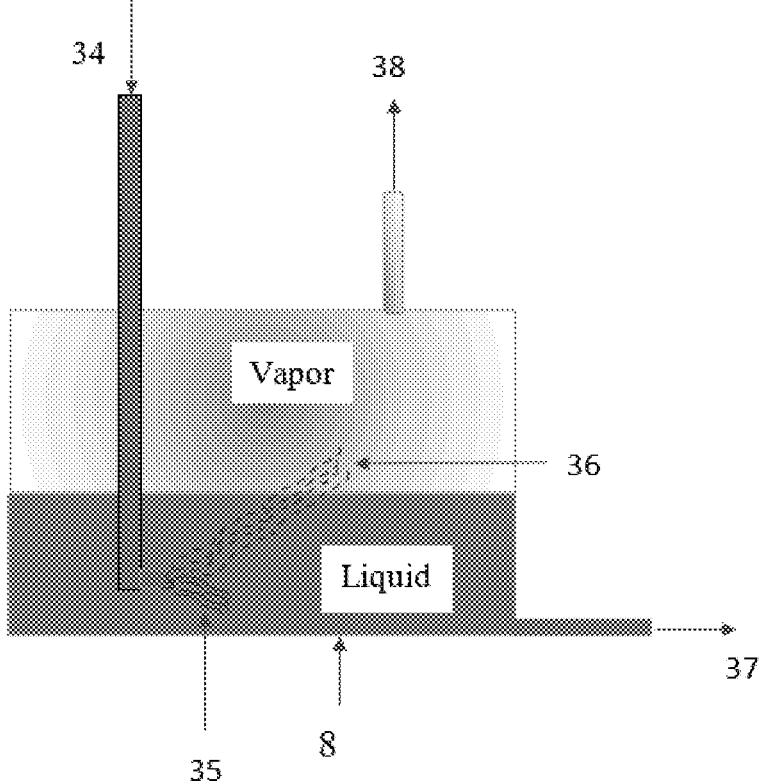

FIG. 5: Block Diagram of Flash Chamber

Figure 6:
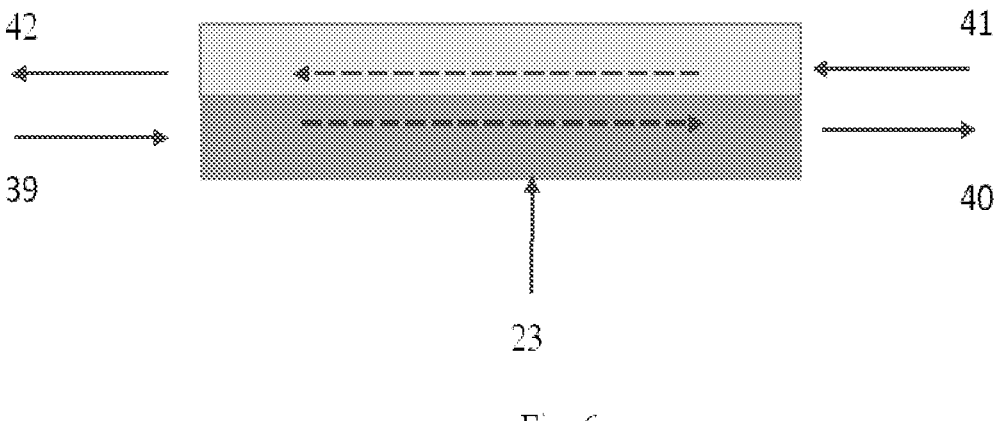

FIG. 6: Block Diagram of Interconnecting Heat Exchanger

Figure 7A:
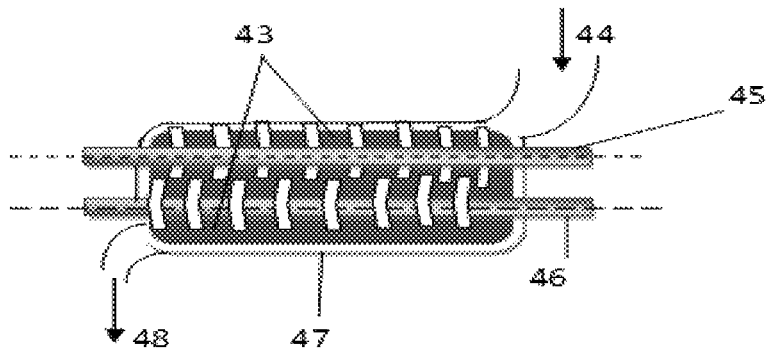

FIG. 7*a*. Schematic diagram of the conventional screw compressor.

Figure 7B:
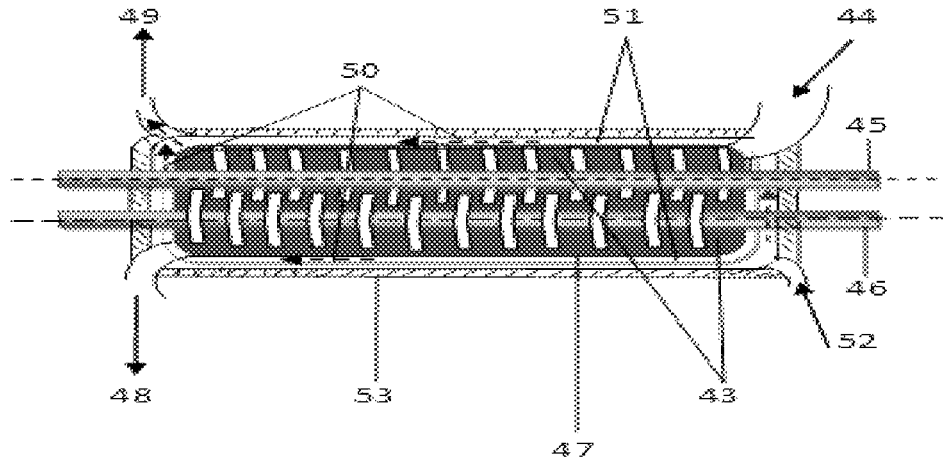

FIG. 7*b*: Schematic diagram of the new polytropic screw compressor of this invention in which compressed liquid nitrogen vapor is cooled by compressed liquid nitrogen.

Figure 8:
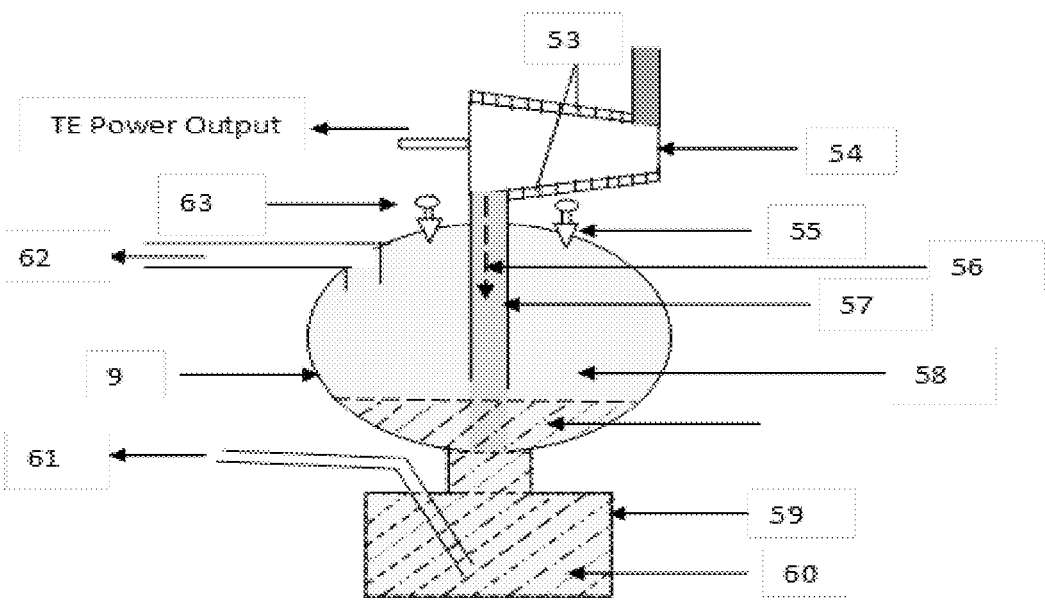

FIG. 8: Schematic diagram of the turbo-expansion of the compressed liquid nitrogen and vapor after absorbing ambient heat and recycling back to compression and re-absorption of ambient heat.

Figure 9:
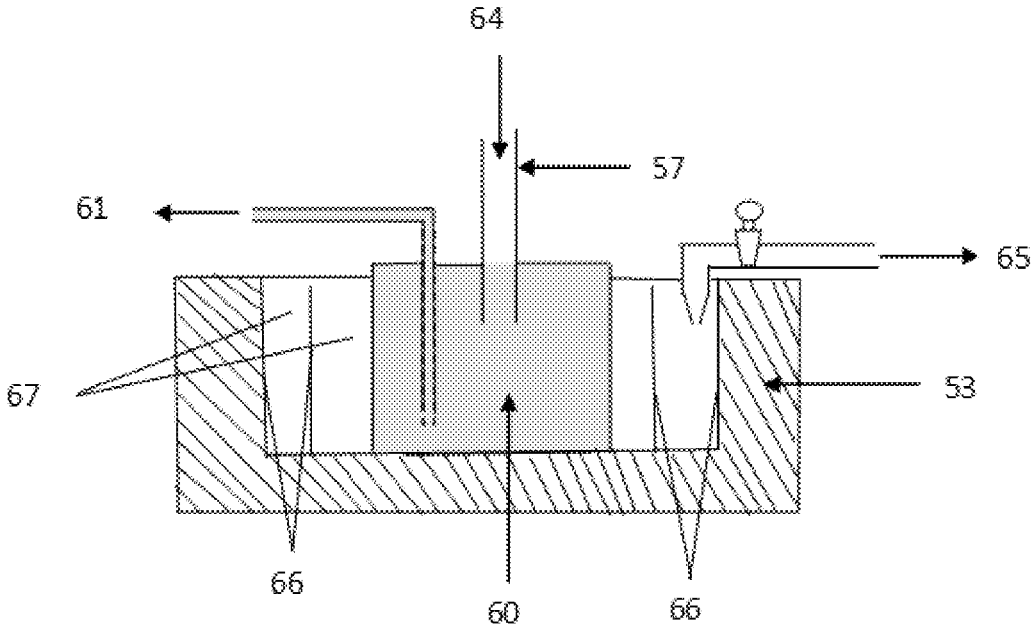

FIG. 9: Schematic diagram liquid nitrogen cryostat where the liquid nitrogen can last for long time (about 60 days) in a recycling process.

Figure 10A:
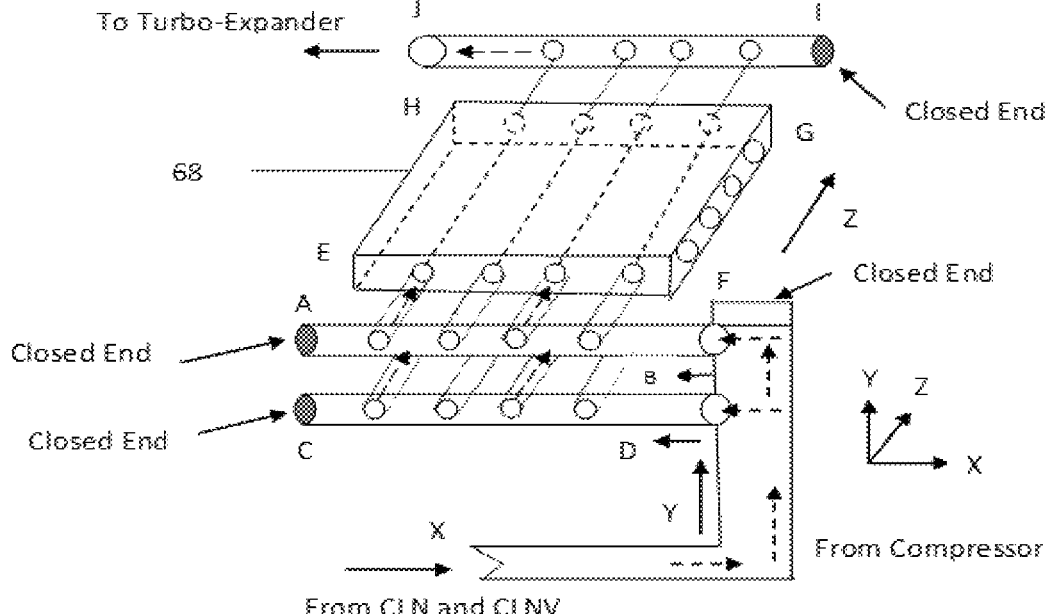

FIG. 10*a*: Block Diagram of Plate Heat Exchanger

FIG. 10*b*: Block Diagram of Tube Heat Exchanger

Figure 11:
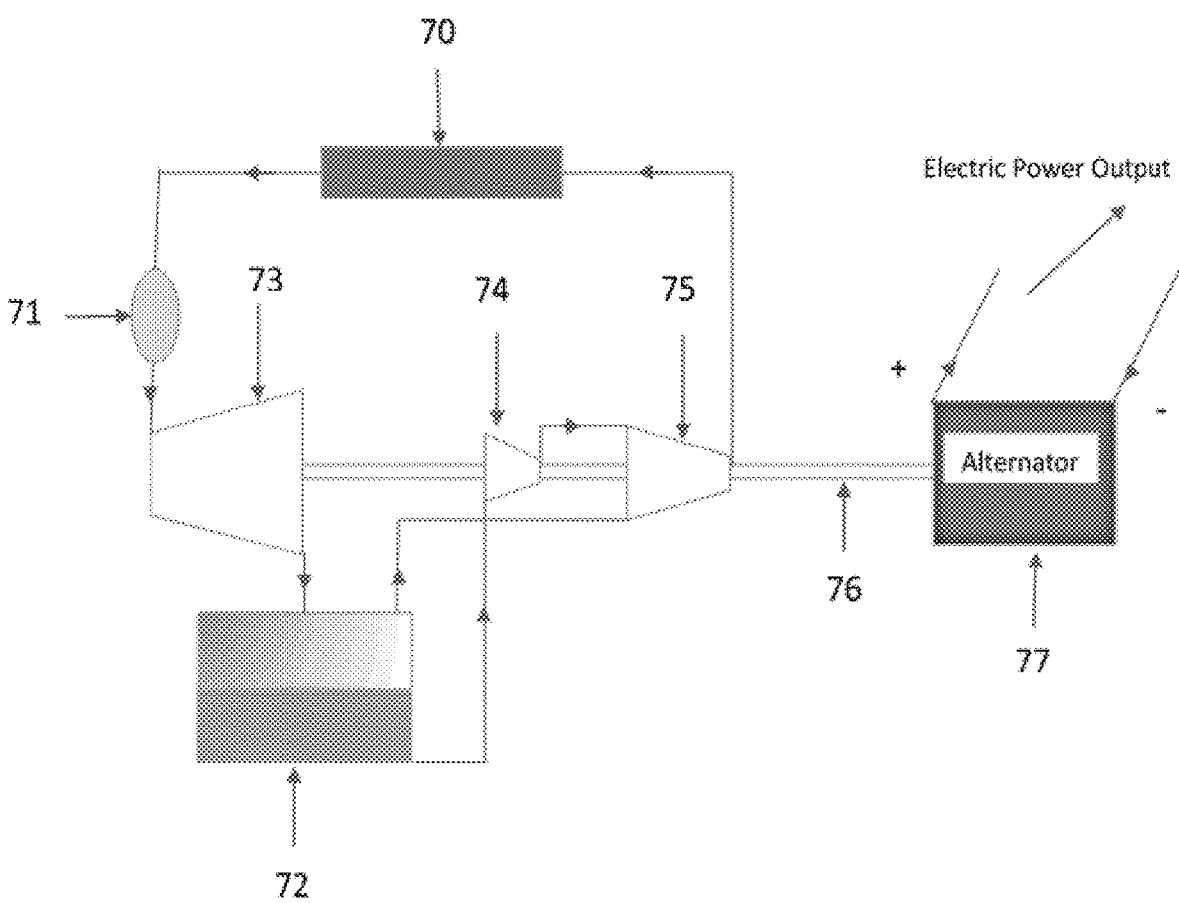

FIG. 11: Block Diagram of an Ambient Heat Engine Electric Power Generation Plant FIG. 12: Block Diagram of an Ambient Heat Engine Automobile Power Transmission System FIG. 13: Schematic of the Heat Exchanger Unit for the 12.5 MW Net Power Output using Ambient Heat Engine FIG. 14: Schematic block diagram of FIG. 11 for clean electrical power generation without using any fuel but only ambient thermal energy of air or water. The mechanical power generated can be used for clean long-distance transportation. It is a single hybrid power engine.

FIG. A: Modeling the heat exchanger.

2. FIELD OF INVENTION

This invention relates to the search for a convenient alternative source of energy to replace the present existing ones in power generation systems, and the mitigating increase in urban air pollution and greenhouse gases that come from vehicle tailpipe emissions, power plants are the primary motivations behind developing alternative transportation and power generation technologies that do not rely on the combustion of fossil fuels. The environmental impact from carbon dioxide discharge is currently unsustainable. Alternatives are a matter of urgency.

Hence the search for a convenient renewable energy source to improve on the present ones in power generation systems, with low, or no emission tendency has been one of the biggest challenges of our present time. This has led scientists and engineers into comprehensive research to discover alternative sources of energy to advance technological development for the enhancement of the human race. These alternative energy sources include: Oceans, Seas and Atmospheric thermal energies, Solar, etc., and through research, it has been discovered that these energy sources can be abstracted and made available for man, though there are limitations to their usage. The new energy source we are introducing is renewable, abundant, non-polluting, cheap, convenient and in-exhaustible; and it is called the Atmospheric Thermal Energy Source (ATES). The system to convert such energy into useful work is referred to as the "Ambient Heat Engine". It makes use of the vast heat energy stored in our surroundings i.e., the NATURAL AIR. The proposed Ambient Heat Engine is a close cycle power plant/engine, which uses liquid nitrogen (LN$_2$) or liquefied air (LAir) as the working fluid. The success of this invention will have a tremendous impact on every know phenomenon of human endeavours, such as Industries, Transportation, Agriculture, Communications, Defence, Space Exploration etc.

We foresee the future of what humanity will look like, if this invention comes into reality and the immense benefit mankind will derive from it.

3. BACKGROUND OF THE INVENTION

Present power generation releases CO$_2$ emissions, as we are faced with climate change and global warming; thus, it has become imperative to look for renewable energy sources which are zero emission in tendency. Besides the toxic emissions associated with CO$_2$ emissions pose serious health hazards. Solar photovoltaic and wind turbines convert renewable energy of the sun into electrical power. However, the power density (power per unit mass of the device) is quite low. For example, a 100 MW solar power plant requires 400-500 acres of land and only the panels (without the other accessories) will weigh anywhere from US 500 to 600 tons depending on the power output per panel which is usually 300-400 W/panel, each panel weighing around 40 pounds. Also, production of solar panels is associated with environmental pollution. On the other hand, a 2 MW wind turbine has a blade diameter of 100 meter and weighs around 11.5 tons. Thus, for 100 MW power generation the total weight would be around 575 tons. Both solar panels and wind turbines cannot generate power 24×7 hours a week as they depend on availability of adequate sunshine and wind speed.

A new technology that ensures generation of clean electrical and mechanical power by harnessing the abundant thermal energy of the atmosphere 24×7 and with much higher power density than solar panels and wind turbine and at much less cost/watt will be in great demand in the future.

The potential of using liquified air (Lair) and liquid nitrogen ($LN_2$) for vehicle propulsion (mechanical power) has been disclosed in several patents issued since the early seventies. Boese and Hencey (1972) [4] proposed a hybrid system in which the cryogen was pressurized and ambient heated to drive a gas motor which turns an alternator, the output from which is used to power an electric motor efficiency of which is enhance with $LN_2$ circulation. A second patent was issued to Boese in 1981 [3] for a $LN_2$ system that scavenged heat from the passenger compartment for air conditioning in conjunction with ambient heat exchangers and expelled the pressurized gas through a rotary vane type turbine. The suggestion of a "master expander coil", i.e., a gas receiver, was also introduced for this system. Manning and Schneider (1974) patented a direct drive system utilizing multiple expansion with intermediate reheats followed by a final stage of gaseous recompression and subsequent heating prior to expansion (Brayton cycle). They even went so far as to propose a regenerative device which alternatively routed cold $N_2$ exhaust and warm ambient air through a volume which contained many tension wires connected to a piston than extracted and relaxed under the thermal cycling to extract the last bit of available heat from the working fluid.

The implementation of $LN_2$ fuelled vehicles by fleet metropolitan buses, and even golf courses is discussed by West et al. (1976) in their patent which focuses on the details of a double acting piston expander to efficiently use the working fluid. Oxley (1980) suggests the liquefaction and separation of air as a means of load-levelling for conventional power plants. The oxygen can be used to enhance the efficiency of fuel combustion and the liquefied gases can be boiled by circulating them round the low temperature end of a Stirling engine using helium as a working fluid.

In a patent issued to Latter et al. in 1980 [12], a system was designed to improve the mileage from conventional fuels (diesel, LNG, etc) by operating a Rankine cycle which converted as much work as practical from an ambient-heated cryogen working fluid ($LN_2$) utilizing a series of reheats before topping the cycle with heat addition from a combustion. A variation of this scheme was to use liquid air first as the working fluid of the Rankine cycle before injecting it with additional fuel into an internal combustion engine. Combining ambient and combustion heat in these systems enables the range of the vehicle to be increased by 50% over that of using each fuel source separately. Scavenging heat from engine friction and vehicle braking was also proposed.

Also, in a patent issued to Oduniyi in 2001 [15], a technique referred to as super multiple reheat was proposed, where the injection pressure is increased to an astronomically high value (i.e., several hundred bars) and the vapor allowed to undergo as many expansion and reheat processes as possible. In this way, the overall specific work output of the plant is increased significantly. The problem posed in this technique is the design of a plant to withstand such an enormous pressure. In all of the works mentioned above the expansion processes are considered to be adiabatic and reheat with multiple expansions were invoked to utilize the cryogen fuel as efficiently as possible.

Many researchers have investigated the energy storage potential of cryogens with the ambience, and have developed several means for converting it into useful work. One of such means as described by Knowlen et al. (1997) [11], is in the development of a Quasi-isothermal expansion engine; this is a reciprocating engine that is configured to maximize heat transfer during the expansion stroke. If sufficient heat input during the expansion process can be realized, then this cryogen propulsive system would provide greater automotive range, and lower operative costs than those of electric vehicles. Increasing the effective energy density of the $LN_2$ by using more complex power cycles as in the use of liquid nitrogen as a heat sink for several cascaded topping cycles has also been examined. Operating conditions for binary ($LN_2$-$CH_4$) and ternary ($LN_2$-$CH_4$-$C_2H_6$) systems were identified to realize specific energies (external work output) in the ranges of 200-380 kJ/kg-$LN_2$ and 300-450 KJ/kg-$LN_2$ respectively, depending on the degree of isothermal expansion that can be realized (Knowlen et al. 1998) [9]. The total energy required currently in the production of liquid nitrogen from the liquefaction of air is 1420 KJ/kg of $LN_2$. Thus, the open cycle cryogenic $LN_2$ power plant/engine is not commercially viable, since we will need more energy in the production of liquid nitrogen than what will be realized in using it as a cryogenic fuel.

Means to extend the range of cryogen powered automobiles via burning a small amount of fossil fuel (gasoline or liquid methane) have also been investigated by developing an ultra-low emission engine. By utilizing both an ambient air-heat exchanger to vaporize the cryogen and a fossil fuel-fired super-heater to elevate the temperature of the gaseous product, the range of the vehicle can be three times that of an ambient-heated propulsion system while not exceeding current ultra-low emission standards (Knowlen et al., 1999) [10]. Fossil fuel consumptions per mile of dual-fuel systems are projected to be over 40% less than that of conventional gasoline automobiles, thus offering the potential of significant reductions in greenhouse gas and pollutant tail pipe emissions. However, considering the production cost of cryogen, the system will not be cost-effective to operate in the open cycle.

A frost-free cryogenic heat exchanger contributes immensely on the performance efficiency for automotive propulsion. The formation of frost on sub-ambient heat exchangers increases conductive resistance to heat transfer, occludes air-side flow passages, and contributes to structural loading (Williams et al., 1997) [22].

The basic idea of a $LN_2$ propulsion system is to utilize the atmosphere as a heat source to vaporize and super-heat the cryogenic fluid for use in a thermal power cycle. This is in contrast with typical heat engines which utilize an energy source at temperatures significantly above ambient and use the atmosphere as a sink [24, 26-30]. In both cases (i.e. in open cycle cryogenic engine and in conventional high temperature engines) the efficiency of conversion of thermal energy of the source to work (w) is limited by the Carnot Efficiency, $\eta_{carrot}=W/Q_{in}=(T_H-T_L)/T_H$. where $Q_{in}$ is heat input, $T_L$ is the lower temperature limit (sink temperature), and $T_H$ is the temperature of the heat source.

Although many researchers have investigated the energy storage potential of cryogens extensively in an open cycle cryogen propulsion system; none has apparently considered the potential for a close cycle cryogen propulsion system, where the working substance will be continuously retained in the cycle. This is necessary because of the low energy density of cryogens, which have made the commercialization of the open cycle cryogenic heat engine impossible due to high operational cost. An innovative concept referred to as "Thermodynamic Cycle Hybridization" is used in this invention to create a close cycle in a cryogen propulsion system; hence this invention will be unravelling the study behind such a concept.

4. OBJECTS OF THE INVENTION

Therefore, an object of invention is to provide a new thermodynamic concept that can close the open cycle cryogenic heat engine, where the working fluid, say, liquid nitrogen, will not be exhausted to the atmosphere, after expansion through the expander; but will be recycled back to its initial state, prior to the next cycle of expansion. This can be done by the separation of the liquid phase (process 2-3) and the vapor phase (process 2-5) at the wet vapor exhaust of the turbo-expander in the flash chamber of the simple hybrid power plant FIG. 1, where the hybrid cycle can be established. This is done because the exhaust vapor from the turbo-expansion in a cryogenic heat engine comes out at temperatures well below any ambient temperature, hence it cannot be condensed by the surroundings as it is done in a conventional close cycle steam engine. Another object is to decrease the gas compression work by polytropically cooling the compressing vapor in the partial refrigeration cycle by the compressed liquid in the partial power cycle (process 5-6) in the polytropic compressor in the simple hybrid power plant (FIG. 1). This compression process will reduce the compression work significantly than when it is isentropically compressed in an adiabatic situation. Still another object of the invention is to reduce the injection temperature appropriately, prior to expansion in the turbine, as to produce enough liquid phase in the wet vapor exhaust to polytropically cool the compressing vapor. If enough liquid is produced, the temperature of the exiting compressed vapor at the exit of the polytropic compressor can be reduced and close to the critical temperature of the working fluid; thus, significantly reducing the compression work further. Also, another object is to increase the effective energy density of the $LN_2$ engine by using more complex power cycles as in the use of liquid nitrogen as a heat sink for several cascaded topping cycles. Since the injection temperature $T_1$ must be made low for the production of enough liquid phase in the wet vapor after expansion in their common expander, to act as coolant in the polytropic compression; the heat energy present in the surrounding ambience of temperature of about 300 K will not be efficiently utilized, thus producing a lower engine power output compared to that in the open cycle where the cryogen is expanded close to the ambient temperature. To utilize effectively the ambient heat for increased power production, the working fluid is used as a heat sink (bottomer) for a cascaded topping cycle (FIG. 3). This added topping cycle is to ensure that the ambient heat is highly utilized and the temperature at which the working fluid is entering the ambient heat exchanger is also higher, as to reduce the formation of frost. In this study, Methane ($CH_4$) gas will be taken as the working fluid (topper) for the topping cycle. Hence the commercial implementation of a binary power plant using ($CH_4$) as working substance will definitely increase the economic value of this gas. An important object also is it can do the functions of a refrigeration plant. This is possible when the ambient heat exchanger of a hybrid cryogenic heat engine or a binary-hybrid cryogenic heat engine running at temperatures well below any ambient temperature replaces the evaporator in a refrigeration system. Therefore, it can then provide both refrigeration and air conditioning at a domestic and industrial capacity.

These all show that our novel technology can perform refrigeration/air conditioning and also deliver useful work/electrical energy utilizing only thermal energy of ambient air. The same is true when ambient thermal energy of water (ocean/river) is similarly utilized.

5. SUMMARY OF THE INVENTION (a) This invention (hybrid power cycle) is a process by which two closed partial cycles are combined; one being a vapor power cycle and the other a reversed power (refrigeration) cycle, with both cycles sharing the same working fluid as they are interconnected by a common expander, as seen in the simple hybrid power plant (FIG. 1). In short, Thermodynamic Cycle Hybridization is the process where a power cycle and a refrigeration cycle sharing the same working fluid are combined.

(b) In this Invention, the saturated liquid and the saturated vapor parts of the working fluid in the partial cycles, which is a fluid with critical temperature usually below the ambient temperature (i.e., cryogen) would have recombined before the inlet to their common expander (i.e., Injection State), prior to expansion. The expanded fluid must be in the state of a wet vapor, where the saturated liquid/vapor mixture is separated in a flash separation chamber at the outlet of the expander after expansion. The saturated liquid goes to the partial vapor power cycle, where it is isentropically compressed by a feed pump (process 3-4, FIGS. 1 and 2) to a compressed liquid at the injection pressure of the system, which is usually above the critical pressure of the liquid; whereas the saturated vapor goes to the partial refrigeration cycle where it is also polytropically compressed, by a polytropic screw compressor (process 5-6, FIGS. 1 and 2) using the compressed liquid as coolant to the same injection pressure to continue the flow through the hybrid power cycle. Thus, we disclose an ambient heat engine that will draw power from the ambient air and convert to 100% clean (i.e., there is no emission) electrical and mechanical power without using any fuel, water and any power/energy from any source.

(c) As the Ambient Heat Engines will be subjected to linkages that can have micro gaps and leakages and boil offs of its working fluids during their operational service years when they are globally implemented; hence the partial fueling of liquid cryogens after some time, say a month, then becomes inevitable. Therefore, a liquid cryogen economy is proposed, where liquid nitrogen is used as the fuel that will cost far less than the conventional fuels for 24×7 operations. A cryogenic nitrogen production and distribution system will have to be developed, just like the petroleum refinery and distribution systems we have presently; and highly specialized small point/station production facilities can also evolve even within city centers, since the primary product for the manufacturing of $LN_2$ is air and it's found everywhere. What we mean is that since the equipment needed for liquefaction is powered solely by electricity it is therefore conceivable to decentralize the 'fuel' manufacturing and to place small production facilities all round a city. Such facilities can be powered also by a fraction of the electrical power generated by this technology invention. Hence the development of large-scale liquefaction plants may not be fashionable, as in the case of petroleum products refineries. Therefore, this invention is expected to lead to liquid nitrogen ($LN_2$) based world economy in the future when the primary form of energy is the abundant heat of the ambient air and liquid nitrogen becomes the media for its conversion to electrical and mechanical power. The electricity thus generated can be used to split water to produce low-cost green hydrogen in abundance for 100% clean transportation in the near future. It is an invention for an alternative source of energy to petroleum. It is a new 24×7 renewable energy technology with very high power density in compact engines and at low-cost.

(d) Ideal analyses conducted in this invention have shown that the energy density of the (LN$_2$) hybrid power cycle is about 60.63 KJ/kg-LN$_2$, while that of the binary (LN$_2$-CH$_4$) system is 77.79 KJ/kg-LN$_2$; thus, showing that the Ambient Heat Engine is an efficient Atmospheric Thermal-Energy Conversion (ATEC) System, where the thermal energy potential of the atmosphere is highly utilized. Hybrid Power Plants utilizing such estimated energy density values in this study will be able to generate billions of megawatts of very cheap electricity (with zero fuel/energy cost) to meet the ever-increasing power needs of mankind.

(e) The energy densities for binary (LN$_2$-CH$_4$) and ternary (LN$_2$-CH$_4$-C$_2$H$_6$) of open cycle cryogenic systems were identified to realize specific energies in the ranges of 200-380 KJ/kg-LN$_2$ and 300-450 KJ/kg-LN$_2$ respectively, depending on the degree of isothermal expansion that can be realized (Knowlen et al. 1998) [9]. These specific energies are much higher than that of the above close cycle hybrid cryogenic engines in our invention, because the working fluid is expanded through reciprocating expanders at a much higher temperature (i.e., slightly below the ambient temperature) in a quasi-isothermal expansion process to atmospheric pressure and close to the ambient temperature after expansion. The nitrogen is lost to the air after expansion and fresh liquid nitrogen is needed in an open cycle cryogenic engine. The cycle could not be closed to use the same fixed amount of liquid nitrogen and vapor repeatedly as compared to our closed cryogenic cycles where the working fluid is expanded at an injection temperature T$_1$ much lower than the ambient temperature in an isentropic (adiabatic) expansion process to produce very wet vapor at temperature around 77 K at the turbine exhaust, as to continue the cycle. As mentioned above the open cycle cryogenic LN$_2$ engine is not viable because the energy input to liquefy LN$_2$ is about 1420 KJ/kg (LN$_2$). However, since the LN$_2$ Dewar (FIG. 9) and the flash chamber (FIG. 8) can be well insulated thermally using both vacuum insulation with high reflection mirror walls and using good insulators like air-silicon, the liquid N$_2$ and its vapor can be contained in the Dewar and flash chamber (FIG. 5) with continuous cyclic operations over a long period. There still could be some small minor losses during compression, pumping and passing through heat exchangers in cases if micro leaks cannot be avoided in the systems. Our estimates show us that liquid N$_2$ and the vapor can substantially be contained in the system with losses no more than 25% during a month of continuous operations. It would not be hard to replace this loss using the RFV in FIG. 8. Modern pumps and compressors can pump and compress hundreds of litres of liquid per second. Thus, even with low specific energy output (60.63 KJ/kg-LN$_2$) in our invention, with continuous operations (24 hours and 7 days a week) our invention will allow virtually cost-free generation of mechanical or electrical power in any amount with zero emission using only the ambient heat as the energy source. This invention can also be applied for future virtually cost-free 100% clean and hazard free transportation (except for the initial vehicle cost) with zero emission. For example, even with 50% energy conversion efficiency of the theoretical 60.63 KJ/kg Lq. N$_2$, a 250 KW (338 horsepower engine)

the liquid N$_2$ tank needs to contain a maximum of 10 kg of N$_2$. In case of accidents, if this entire liq. N$_2$ and vapor vents out (which is very unlikely, as it will be well-secured) the resulting vapor will quickly disperse through air and there will be no fire or cold hazard. Moreover, the vehicle will be safe and can be reused by pumping the required liq. N$_2$ into the tank. Thus, this technology can be the most environment friendly of all inventions hitherto known. Whatever amount of LN$_2$ is required in generating future power and for future transportation with our invention can be obtained by using a very small part of the electrical energy thus generated.

(f) We also discover that by adjusting the injection temperature, injection pressure and exhaust pressure, we can increase the specific output energy from 60KJ/kg (N$_2$) to 90 KJ/kg (N$_2$) without any problem. With proper temperatures and pressures the liquid N$_2$ and the saturated vapor will be regenerated with the same ratio at the end of the cycle as in the beginning of the cycle.

(f) As the development of Hybrid Power Systems worldwide will improve on 100% clean power production, it will fast track rapid development for the transformation of our average global economy from a developing to a developed one. Such systems can also be used as stand-alone systems for (1) air-conditioning and power supply of individual homes to large buildings and factories; (2) for charging conventional electrical vehicles.

(g) This invention will give us a unique opportunity to utilize ambient thermal energy of water sources (lake, river and ocean) to generate electrical power and for marine transportation without using any type of fuel and with reduced size of lithium battery pack.

6. Additional Benefits Accruing from this Invention (a) The potential for utilizing the available energy of the ambient air or water via liquid cryogens for automotive propulsion and power generation now looks very promising with our invention. A liquid cryogen-based economy, which is a future invention as an alternative to petroleum, is a means of locally storing energy captured from renewable sources. It is an alternative to the inevitable demise of the petroleum-age, which is seen as a catastrophic collapse as fossil fuels provide about 75% of the world's energy requirements.

(b) We have prior inventions [37, 38] that ensure carbon capture energy considerably lower than the lowest of all other existing technologies. Generating the required energy with the technology of this invention, the carbon capture cost with our technologies will be reduced significantly to the level that is unattainable by other foreseeable technologies and thus enabling low-cost climate mitigation at scale.

(c) Manufacturing LN$_2$, LO2 from ambient air inherently removes small quantities of atmospheric pollutants and the installation of large-scale liquefaction equipment at existing fossil-fueled power stations could make flue gas condensation processes economical and even eliminate the emissions of CO2 (Cooper. I., et al., 1981) [5].

(d) As the required energy source is the enormous ambient heat energy present in the environment, which is unquantifiable, constantly maintained by the sun and hence ever present, and in-exhaustible, the eventual development of this power-system will lead to tremendous advances in automotive and power generation applications, as the working fluid is continuously retained in the cycle and the cost of constant refilling of liquid cryogens greatly reduced.

(e) Here the energy comes from the ambient heat that is abundantly available and maintained by the sun. Generating mechanical or electrical power thus will cool the ambient air a bit instantly but when such generated power/energies are used by devices, ultimately the heat energy generated through irreversible processes (such as friction) will replenish the ambient heat drawn for the said conversion. Moreover, the amount of annual solar energy pouring on earth is about 8000 times the total annual energy consumption of the world. Thus, there will be no shortage of this ambient energy which we want to convert to electrical and mechanical power using our novel science and technology and this technology will not contribute towards global warming unlike the fossil fuel-based technologies. This technology will always allow indirect conversion of solar energy into electrical power but with much higher power density than that of solar panels and wind turbine and almost and in all places on earth 24×7 and will prevent further rise in global temperature and environmental pollution. The latter occurs due to the (i) heat produced by power plants/industries; (ii) carbon emission and consequent global warming. Since the source of energy is free, the technology will enable carbon capture free of energy-cost with a suitable carbon capture technology as developed by Oduniyi and De (2020, 2023). No foreseeable energy technology can be envisioned to be able to compete with these two technologies in clean energy (electrical and mechanical) generation and carbon capture at a low cost. The cost of the energy source (ambient air-energy) with our technology is just zero.

(f) The future transportation system resulting from this invention will have significant advantages over the current transportation systems as the future transportation can be completely pollution free and virtually energy-cost free (since only very little $N_2$ would be used up over continuous operation over a month) and would not require frequent electric charging as in the current EV systems. The transportation will also be fire-hazard free as there is no combustible fuel. Even the current electric vehicles (EVs) are not fully environment friendly unless the electric power is generated with zero emission, i.e., using solar panels and wind turbines. Current renewable power generation, unlike this new technology of invention, is time and location limited. There is significant environmental pollution resulting from manufacturing of solar panels. Moreover, the future vehicles using our invention will not require frequent charging or refueling and big lithium batteries as with current electric vehicles (EVs). Extraction and processing of lithium causes large environmental pollution. Lithium batteries are explosives when they come in contact with water. Thus, the future vehicles with our new technologies are expected to be eco-friendlier, safer than the currents EVs. It should be noted that the liquid nitrogen required for this technology can be produced by the low-cost clean power thus generated. Thus, the cost of liquid nitrogen can go down significantly.

7. BRIEF DESCRIPTION OF DRAWINGS

A diagrammatic sketch of a simple hybrid power plant is represented in FIG. 1, accompanying by the T–s diagram in FIG. 2. In the diagrammatic sketch of FIG. 1, it is observed that the process path 1-2-3-4-r-1 represents the partial vapor power cycle and the process path 1-2-5-6-1 represents the partial refrigeration cycle.

FIG. 1 is a block diagram that shows schematically the main equipment in accordance with the invention of the nitrogen hybrid power plant for abstracting ambient heat to produce useful work, in accordance with the principle of thermodynamic energy conversion processes. It comprises of the following symbols (i) $TE_1$-Expansion Turbine, which is a two-phase impulse turbo-expander, that expands the dry nitrogen gas at the injection state to wet nitrogen vapor at the exhaust state of the turbine exit; here the motive force of the engine is produced ($W_{t1}$). (ii) FC-Flash Chamber, which is a vacuum insulated chamber collects the expanded vapor, which is at a wet vapor state at the exit of the turbine. Here the wet vapor is separated into the saturated liquid and saturated vapor states. (iii) $PP_1$-Feed Pump, which is an insulated cryo-pump, compresses the saturated liquid in the flash chamber to the operational pressure of the system by a work-input ($W_{p1}$). (iv) PC-Polytropic Screw Compressor, which is a positive displacement compressor, compresses the saturated vapor in the flash chamber to the operational pressure of the system by a work-input ($W_c$). Here the compressed liquid from the feed pump acts as a coolant for the polytropic compression of the saturated vapor from the flash chamber. (v) $HE_1$-Ambient Heat Exchanger, which heats the compressed liquid coolant as it leaves the polytropic compressor, to the injection temperature of the system by a heat transfer of ($Q_{in1}$) from the ambience. (vi) $HE_2$-Ambient Heat Exchanger, which heats the polytropically compressed vapor from the exit of the polytropic compressor, to the injection temperature of the system by a heat transfer of ($Q_{in2}$). (vii) $R_1$-Receiver, which is a vapor filled chamber, is vacuum insulated to prevent further heating from the ambience, as not to increase the temperature of the working nitrogen fluid than the injection temperature of the system. Here the different streams of heated vapor from different heat exchanger plates (FIGS. 10a,b, FIG. 13) are received and mixed together prior to the expansion in the single turbine. It also minimizes pressure surges in the system due to changing power demands in the turbine engine, and always determines the initial starting of the engine by releasing high pressure gas at the injection pressure into the turbo-expander.

In the FIG. 1, the turbine, the piping tubes connecting the liquid nitrogen cryostat (FIGS. 8 and 9) to the turbine and the pump, screw compressors are all vacuum insulated and other connecting tubes are vacuum insulated as necessary in order to minimize the fluctuations in the temperature and pressure of the cryogen (due to heat flow from the surrounding as the entire system operates below ambient temperature) from the desired values.

The following piping ducts contain the various states of the working fluid in the system: (i) The piping duct $WF_1$ contains working fluid at a super critical state of pressure $P_1$ and injection temperature $T_1$. (ii) $WF_2$ contains wet vapor at pressure 1.013 bars and temperature 77.3 K. (iii) $WF_3$ contains saturated liquid at pressure 1.013 bars and temperature 77.3 K. (iv) $WF_4$ contains compressed liquid at pressure $P_1$, and at the temperature at which it leaves the feed pump. (v) $WF_5$ contains saturated vapor at pressure 1.013 bars and temperature 77.3 K. (vi) $WF_6$ contains compressed liquid, or super critical vapor at pressure $P_1$, and at temperature Tr (i.e., temperature of the coolant as it leaves the polytropic compressor) (vii) $WF_7$ contains super critical vapor at pressure $P_1$ and temperature $T_6$ (i.e., temperature of the compressed vapor as it leaves the polytropic compressor). (viii) $WF_8$ contains super critical vapor at pressure $P_1$ and injection temperature $T_1$. (ix) $WF_9$ also contains super critical vapor at pressure at $P_1$ and temperature $T_1$. Even though two heat exchangers are shown in FIG. 1 and also considered in theoretical analysis later, we have determined that one heat exchanger where the liquid $N_2$ (after compression) and nitrogen vapor (after polytropic compression-see FIG. 3 state y) after prior mixing are passed will do the same work as two heat exchangers.

FIG. 2 is the Temperature-entropy (T–s) diagram of the schematic of the hybrid power plant of the main equipment of the invention in FIG. 1.

A diagrammatic sketch of a simple binary hybrid power plant of the ambient heat engine is represented in FIG. 3, using (CH$_4$) as the working fluid for the topping cycle.

FIG. 3 is a block diagram that shows schematically the main equipment in accordance with the invention of the (LN$_2$-CH$_4$) Binary Hybrid Power Plant for abstracting ambient heat to produce useful work, in accordance with the principle of thermodynamic energy conversion processes. It comprises of (1) the LN$_2$ hybrid power engine as the bottomer with the following symbols (i) TE$_1$-Expansion Turbine, which is a turbo-expander, which expands the dry nitrogen gas at the injection state to wet nitrogen vapor at the exhaust state of the turbine exit; here the motive force of the engine is produced (W$_{t1}$). (ii) FC-Flash Chamber, which is a vacuum insulated chamber collects the expanded vapor, which is at a wet vapor state at the exit of the turbine. Here the wet vapor is separated into the saturated liquid and saturated vapor states as depicted by the block diagram of a flash chamber in FIG. 5. (iii) PP$_1$-Feed Pump, which is an insulated cryo-pump, compresses the separated saturated liquid in the flash chamber to the operational pressure of the system by a work-input (W$_{p1}$).

(iv) PC-Polytropic Screw Compressor, which is a positive displacement compressor, compresses the separated saturated vapor in the flash chamber to the operational pressure of the system by a work-input (W$_c$). Here the compressed liquid from the feed pump acts as a coolant for the polytropic compression of the separated saturated vapor, before they are both combined to a single stream (state y in FIG. 3) on leaving the compressor. This combination or mixing can take place in the broad diameter tube of heat exchangers in FIGS. 10a,10b. (v) HE$_3$-Interconnecting Heat Exchanger (shell and tube heat exchanger), which is a counter-flow heat exchanger (FIG. 6), heats the combined nitrogen working fluid as it leaves the polytropic compressor (state y), to the injection temperature of the system by heat transfer from the condensing methane vapor in the methane power engine as topper.

(vi). R$_1$-Receiver, which is a vapor filled chamber is vacuum insulated to prevent any heating from the ambience, as not to increase the temperature of the working nitrogen fluid than the injection temperature of the system, prior to the expansion in their common turbine. It also minimizes pressure surges in the system due to changing power demands in the turbine engine, and always determines the initial starting of the engine by releasing high pressure gas at the injection pressure into the turbo-expander.

(2) the CH$_4$ power engine as the topper with the following symbols (i) TE$_2$-Expansion Turbine, which expands the methane gas at the injection state to the exhaust state at the exit of the turbine; here the motive force of the engine is produced (W$_{t2}$). (ii) HE$_3$-Interconnecting Heat Exchanger, which is a counter-flow heat exchanger as depicted by the block diagram of an interconnecting heat exchanger in FIG. 6, cools and condenses the methane vapor at the exit of the turbine to saturated liquid, by the vaporizing nitrogen in the nitrogen hybrid power engine as bottomer. (iii) PP$_2$-

Feed pump, which compresses the saturated liquid at the exit of the interconnecting heat exchanger to the operational pressure of the system by a work-input (W$_{p2}$). (iv) HE$_4$-Ambient Heat Exchanger, which heats the compressed liquid at the exit of the feed pump at constant pressure, to the injection temperature of the system by heat transfer from the ambient surroundings (Q$_{in3}$). (v) R$_2$-Receiver, which is a non-insulated vapor filled chamber, allows heating from the ambience, as to maintain the temperature of the methane gas at the injection temperature of the system, prior to the expansion in the turbine. It also minimizes pressure surges in the system due to changing power demands in the turbine engine, and always determines the initial starting of the engine by releasing high pressure gas at the injection pressure into the turbo-expander.

In the FIG. 3, the piping tubes connecting the various components of the main equipment are vacuum insulated, so that heat does not flow from the ambient surroundings to the working fluid in the system; as the system operates below ambient temperature. The following piping ducts contain the various states of the working fluid in the system: (i) The piping duct WF$_1$ contains nitrogen working fluid at super critical state of pressure P$_1$ and injection temperature T$_1$. (ii) WF$_2$ contains wet vapor at pressure 1.013 bars and temperature 77.3 K. (iii) WF$_3$ contains saturated liquid at pressure 1.013 bars and temperature 77.3 K. (iv) WF$_4$ contains compressed liquid at pressure P$_1$. (v) WF$_5$ contains saturated vapor at pressure 1.013 bars and temperature 77.3 K. (vi) WF$_y$ contains compressed liquid or super critical vapor at pressure P$_1$, at temperature of the combined nitrogen fluids at (state y) (FIGS. 3 and 4). (vii) The piping duct WF$_a$ contains methane working fluid at super critical pressure of 80 bars and temperature of 275 K, prior to expansion. (viii) WF$_b$ contains super-heated vapor at pressure 19.36 bars and temperature at the exit of the turbine. (ix) WF$_c$ contains saturated liquid at pressure 19.36 bars and temperature 165 K. (x) WF$_d$ contains compressed liquid at pressure 80 bars and temperature at the exit of the feed pump. (xi) WF$_e$ contains super critical vapor at pressure 80 bars and temperature 275 K.

FIG. 4 is the Temperature-entropy (T–s) diagram of the schematic of the (LN$_2$-CH$_4$) Binary Hybrid Power Plant of the main equipment of the invention in FIG. 3. The state r and state 6 in FIG. 4 are not indicated in FIG. 3 as they are assumed to have both combined together to give state y, as shown in FIG. 3 and FIG. 4.

FIG. 5 is a block diagram of the flash chamber, which is the main equipment that separates the liquid from the vapor in the wet vapor that exits the turbine. It comprises of the following symbols (i) FC-Flash Chamber, which is a vacuum insulated chamber collects the expanded vapor, which is at a wet vapor state at the exit of the turbine. Here the wet vapor is separated into the saturated liquid and saturated vapor states. (ii) F1, which is the wet vapor fluid from the turbine exit. (iii) F2 is the liquid precipitating downward from the wet vapor. (iv) F3 is the vapor bubbling upwards from the wet vapor. (v) F4 is the separated saturated liquid flowing to the pump. (vi) F5 is the separated saturated vapor flowing to the polytropic compressor.

FIG. 6 is the block diagram of the interconnecting heat exchanger, which is a shell and tube heat exchanger in a counter-flow direction that cools and condenses the methane vapor from the exit of the turbine to saturated liquid, by vaporizing nitrogen in the nitrogen hybrid power engine as bottomer. It comprises of the following symbols (i) HE$_3$-Interconnecting Heat Exchanger, which is an insulated counter-flow heat exchanger. (ii) F6 is the incoming compressed liquid, or super critical vapor of the combined nitrogen fluids from the hybrid power cycle. (iii) F7 is the out coming super critical vapor of dry the nitrogen gas from the exit of the interconnecting heat exchanger. (iv) F8 is the incoming super-heated methane vapor from the exhaust of the CH₄ turbine. (v) F9 is the out coming saturated methane liquid from the condensation of the super-heated vapor from the CH₄ power cycle.

In FIG. 7a, which shows the schematic drawing of a conventional air screw compressor, which consists of a compression chamber (CC), that comprises the male rotor (MR) and female rotor (FR), which merge together as the rotating shaft rotates, compressing the air (CV) and pushing it forward from the vapor inlet port (VIP) to the vapor outlet port (VOP); where it is discharged at a designed pressure. A screw compressor is a positive displacement compressor (i.e., pressure increases by reduction in volume of gas) in which the compression of the vapor is accomplished by two mutually engaged helical grooved rotors enclosed in a casing. The rotor which shaft is connected to the motor is called the male rotor (driving rotor), and the other one is called the female rotor (driven rotor). The male rotor consists of a series of lobes (usually four) along its length, which merge or engage with similarly formed helical flutes (inter-lobes or gullies) usually six on the female rotor.

Meshing is such that, the lobes projecting or jutting out of the male rotor get placed in hollow portion of the female rotor. Initially, before this intermeshing, the hollow portion remains filled with gaseous fluid at inlet part. As rotation begins, the surfaces in contact move parallel to the axis of rotors towards the outlet end gradually compressing the vapor till the trapped volume reaches the outlet before getting discharged out at a designed pressure. As the rotors start to rotate and turn, the vapor is sucked through the inlet opening at suction port and gets sealed in the space available between the male lobe and the female flute. The space is also called the inter-lobed space. As the rotors continue to rotate, meshing of the lobes of male rotors and the flutes of female rotors starts, and progressively reduces the volume of the inter-lobed space, thereby compressing the entrapped vapor. Compression of the vapor continues as it is pushed forward, until the inter-lobed space reaches the outlet opening located at the end of the housing. Finally, the compressed vapor leaves the cylinder (housing) through the outlet opening.

FIG. 7b shows the proposed schematic drawing of the polytropic vapor cryogenic screw compressor that will be used in the invention. The compressor consists of a compression chamber (CC) similar to the conventional air screw compressor, which will have the male rotor (MR) and female rotor (FR) made of stainless steel, and having its boundary surrounded by a coolant chamber (CLC) having a coolant inlet (CI) and coolant outlet (CO). As the vapor is compressed in the lower chamber, heat is generated by the compressing vapor (CLNV), which is cooled by a coolant (i.e., liquid nitrogen) running through the upper coolant chamber (CLC) in a combined parallel and cross flow pattern (coolant flow direction) (CFD) to the compressing vapor (CLNV). The surface boundary (a conductive metal barrier, i.e., the compression chamber walls) between the coolant chamber and the compressing vapor chamber will be made of alloys of aluminum and copper for high mechanical strength and good thermal conductivity. The thickness can be determined by the maximum pressure difference P₁ and moduli of the material. The outer side of the wall of the coolant chamber in highly insulated by an insulator (INS) to prevent heat flow from the ambience, before placing into the compressor outer casing (housing) usually made of cast iron. The length of the compressor FIG. 7b will be longer than the conventional screw compressor in FIG. 7a, to allow for large surface area and increased time for heat transmission between the compressing liquid nitrogen vapor (CLNV) and the coolant (CLN). This will enhance the cooling process of the compressor significantly, thus reducing the compression work input tremendously. The vapor and the coolant will remain at some temperature differences until they are mixed at the entrance to the heat exchanger point. At the mixing phase their temperature is calculated to be around Ty. The length and/or the cross sectional area of the compression chamber can be further increased for larger surface areas to enhance the cooling process of the compressor significantly, to reduce the mixing temperature below Ty.

FIG. 8 is a block diagram that shows the Schematic of the Turbo-Expander, Flash Chamber, Liquid Nitrogen Storage and Circulating Systems with FIG. 9, which shows the block diagram of the Insulated Liquid Nitrogen Storage and Circulating Systems comprise of the following symbols (i) FC-Flash Chamber Insulation, (ii) TE-Turbo-Expander, (iii) RFV-Refilling Valve of Liquid Nitrogen, (iv) SFV-Safety Valve of Liquid Nitrogen Dewar, (v) NSV-Nitrogen Saturated Vapor, (vi) LN-Liquid Nitrogen, (vii) TLNP—To Liquid nitrogen Pump, (viii) TSVC—To Saturated Vapor Compressor, (ix) LND-Liquid Nitrogen Dewar, (x) TECP-Turbo-Expander Connecting pipe, (xi) TVP—To Vacuum Pump, (xii) FFC—From Flash Chamber (liquid nitrogen and its saturated vapor entering the storage LND), (xiii) INS-Insulators, (xiv) HC-High Reflection Mirror Coating, (xv) NWV-Nitrogen Wet Vapor from Turbine Exhaust, (xvi) VC-Vacuum Compartments.

FIG. 10a, which shows the Block Diagram of a Plate Heat Exchanger and FIG. 10b which shows that of a Tube Heat Exchanger comprise of the following symbols (i) HEP-Heat Exchanger Plate, (ii) HET-Heat Exchanger Tubes, (iii) CLN-Compressed Liquid Nitrogen, (iv) CLNV-Compressed Liquid Nitrogen Vapor. In this type of heat exchanger (FIG. 10a) CLN and CLNV coming out of a screw compressor (FIG. 7b) is fed to a large diameter tube at the entrance to the heat exchanger. In this tube CLN and CLNV mixes and the compressed vapor attains a common temperature which for best performance is found out to be around Ty. From this larger diameter tube the mixture of CLN and CLNV fans out to a hollow plate HEP over the two broad surfaces of which air flows at speed to deliver the ambient heat to CLN and CLNV. In FIG. 10b the CLN and CLNV mixture flow through many narrow tubes (of diameter 1-2 cm) over which air flows. This sort of heat exchanger can present a broader surface area to the air for heat transfer to CLN and CLNV mixture.

FIG. 11 is a block diagram that shows schematically the main equipment in accordance with the invention of an Ambient Heat Engine Electric Power Generation Plant. It comprises of the following symbols (i) TE1-Expansion Turbine, which is a two-phase impulse turbo-expander, that expands the dry nitrogen gas at the injection state to wet nitrogen vapor at the exhaust state of the turbine exit; here the motive force of the engine is produced that drives the pump, compressor and finally the electric alternator. (ii) FC-Flash Chamber, which is a vacuum insulated chamber collects the expanded vapor, which is at a wet vapor state at the exit of the turbine. Here the wet vapor is separated into the saturated liquid and saturated vapor states. (iii) C1-Feed Compressor Pump, which is an insulated cryo-pump, compresses the saturated liquid in the flash chamber to the operational pressure of the system. (iv) C2-Polytropic Compressor, which is a liquid cooled positive displacement compressor, compresses the saturated vapor in the flash chamber to the operational pressure of the system. (v) HE1-Ambient Heat Exchanger, which heats the combined nitrogen working fluid as it leaves the polytropic compressor, to the injection temperature of the system by heat transfer from the ambience. (vi) R1-Receiver, which is a vapor filled chamber, is vacuum insulated to prevent further heating from the ambience, so as not to increase the temperature of the working nitrogen fluid than the injection temperature of the system. It also minimizes pressure surges in the system due to changing power demands in the turbine engine, and always determines the initial starting of the engine by releasing high pressure gas at the injection pressure into the turbo-expander. (vii) S1-Power Transmission Shaft, it transmits mechanical power from the ambient heat engine to the electric alternator. (viii) A1-Electric Alternator, it converts the mechanical energy conveyed to it, to electrical energy.

Figure 12:
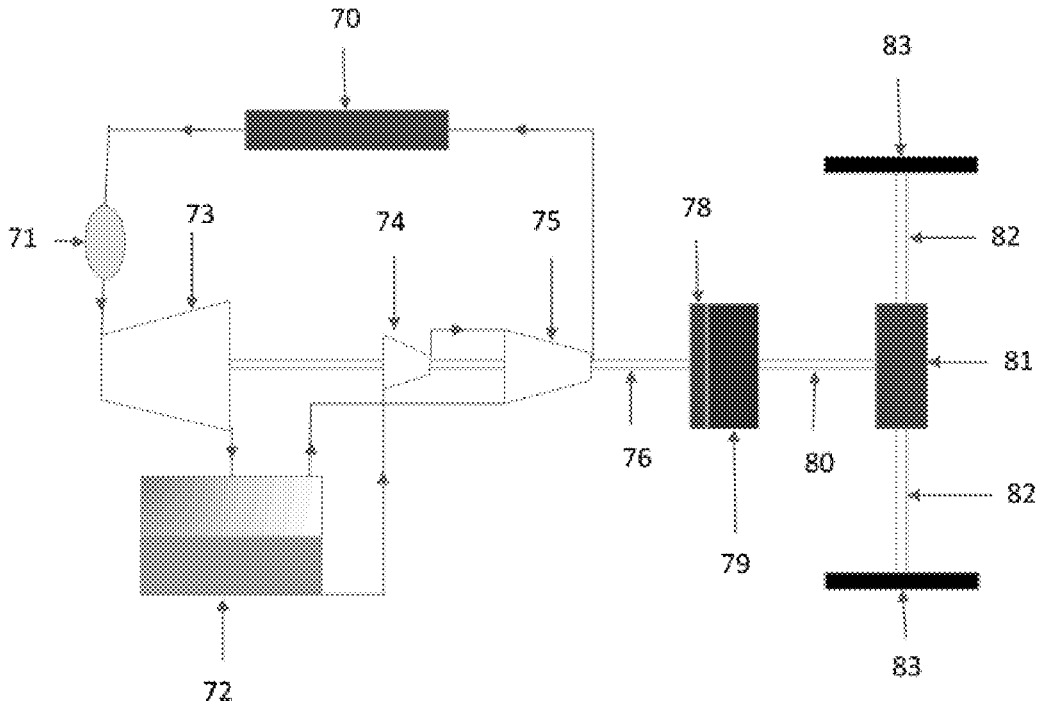

FIG. 12 is a block diagram that shows schematically the main equipment in accordance with the invention of an Ambient Heat Engine Automobile Power Transmission System (AHEAPTS) for clean transportation. The main function of the transmission system is to transmit power from the engine to the rear wheel of the car, and to alter the ratio of engine speed to wheel speed. It comprises of the following symbols (i) TE1-Expansion Turbine, which is a two-phase impulse turbo-expander, that expands the dry nitrogen gas at the injection state to wet nitrogen vapor at the exhaust state of the turbine exit; here the motive force of the engine is produced that drives the pump, compressor and finally the transmission system. (ii) FC-Flash Chamber, which is a vacuum insulated chamber collects the expanded vapor, which is at a wet vapor state at the exit of the turbine. Here the wet vapor is separated into the saturated liquid and saturated vapor states. (iii) C1-Feed Compressor Pump, which is an insulated cryo-pump, compresses the saturated liquid in the flash chamber to the operational pressure of the system. (iv) C2-Polytropic Compressor, which is a liquid cooled positive displacement compressor, compresses 9the saturated vapor in the flash chamber to the operational pressure of the system. (v) HE1-Ambient Heat Exchanger, which heats the combined nitrogen working fluid as it leaves the polytropic compressor, to the injection temperature of the system by heat transfer from the ambience. (vi) R1-Receiver, which is a vapor filled chamber, is vacuum insulated to prevent further heating from the ambience, so as not to increase the temperature of the working nitrogen fluid than the injection temperature of the system. It also minimizes pressure surges in the system due to changing power demands in the turbine engine, and always determines the initial starting of the engine by releasing high pressure gas at the injection pressure into the turbo-expander. (vii) S1-Power Transmission Shaft, it transmits mechanical power from the ambient heat engine to the transmission system. (viii) S2-Clutch, it engages and disengages the transmission system from the engine when the engine is being driven from a standstill, and when the gearbox gear change is necessary. (ix) S3-Gear Box, it is considered as the heart of the transmission system, and located between the clutch and the propeller shaft. It varies the leverage (speed ratio and hence torque ratio) between the engine and driving wheels. (x) S4-Propeller Shaft, it is use to transmit power from the gear box to the differential. (xi) S5-Differential, it transfers the engine power to the rear wheels, and acts as a final gear reduction to the vehicle. It also makes the wheels to rotate at different speeds neglecting the turn. (xii)

S6-Drive Axles, they finally provide power from the engine to the road wheels. (xiii) S7-Road Wheels, they finally drive the vehicle.

Figure 13:
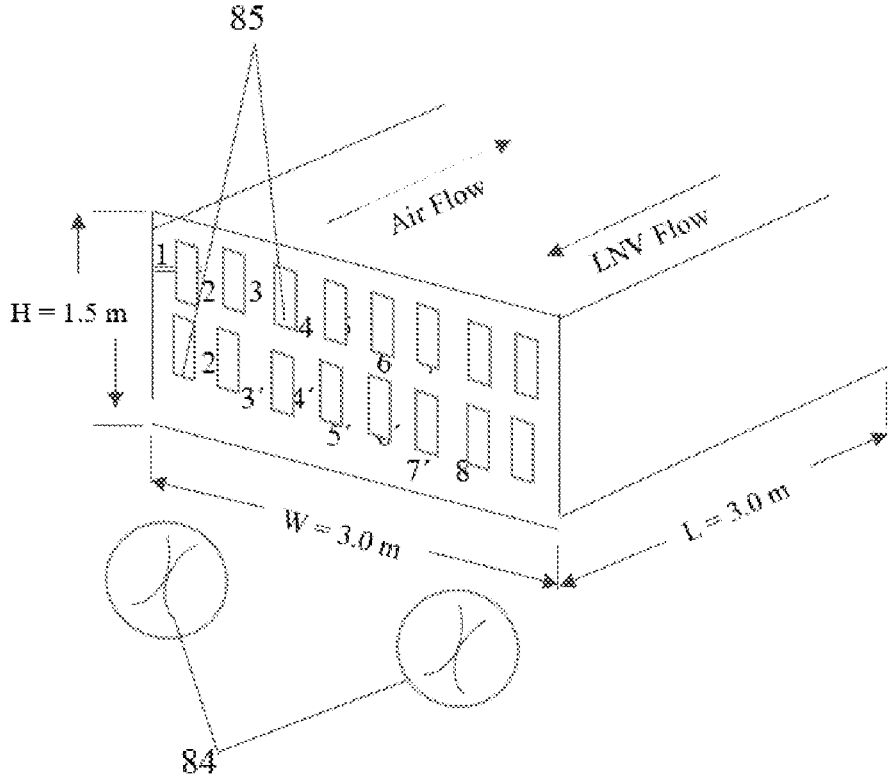

FIG. 13 depicts the structure of the final heat-exchanger structure. The hollow plates 1-8 and 1'-8' are vertically arranged. They are kept in an enclosure of dimensions (height×width×length) approximately 1.5 m×3.0 m×3.0 m. The compressed liquid nitrogen (CLN) and its compressed vapor (CLNV) from the polytropic screw compressor (FIG. 7*b*) enters from the back end using arrangement shown in FIGS. 10*a* and 10*b*, while the high blast of air (using fans) enter at ambient temperature from the front. The LNV absorbs heat from the air and its temperature rises from approximately $T_y$ to $T_1$. Then it enters the turbo-expander TE1 of FIGS. 11 and 12.

Figure 14:
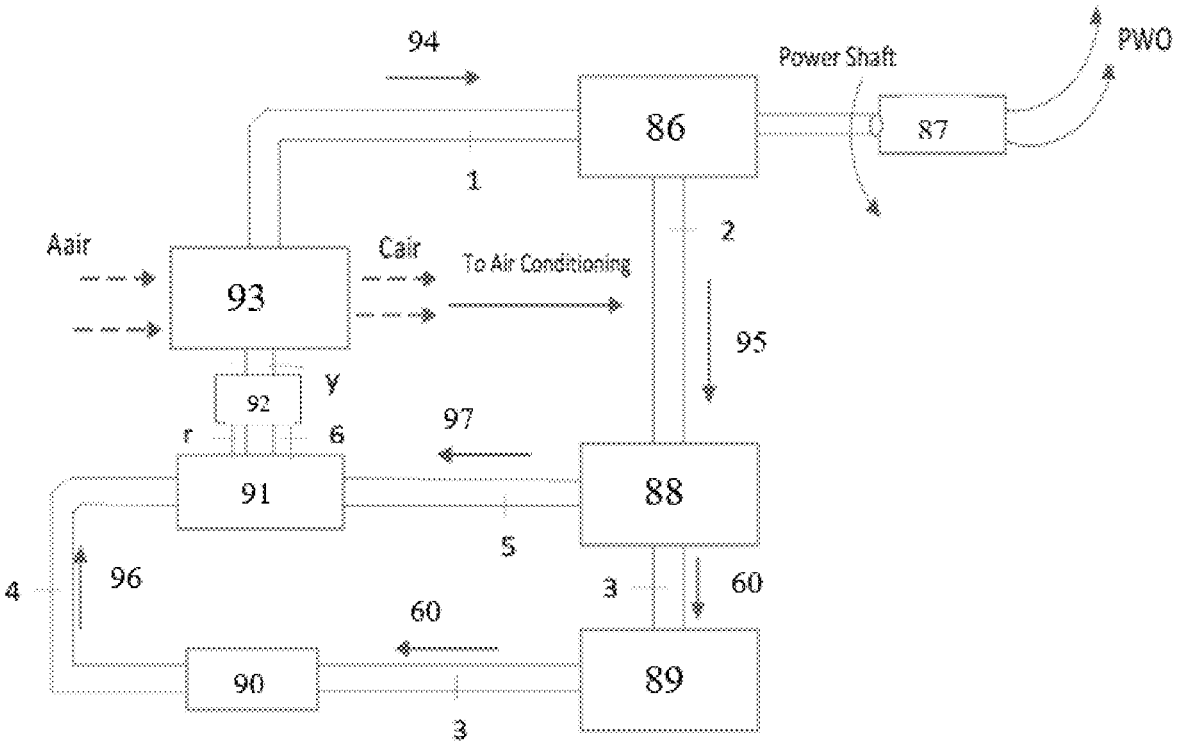

FIG. 14: APWG-Ambient heat power generator (generation), a schematic version of FIG. 11; $A_{air}$-Ambient Air flow to Heat Exchanger (HEX); $C_{air}$-Cold Air exiting from HEX; CRY-Highly Insulated Cryostat with liquid nitrogen ($LN_2$); PCP-Pump (High Pressure); PSC-Polytropic Screw Compressor; TRE-Turbo-Expander; DYN-Dynamo to convert rotational energy of the shaft to electrical power; CLN-Compressed Liquid Nitrogen; CNV-Cold Nitrogen Vapor; LNV-A Single Fluid Stream of high pressure; HNV-LNV with high energy from Ambient Air and the fluid in super critical state (FIG. 1); NWV-Cold Nitrogen Wet Vapor; $LN_2$-Liquid Nitrogen; FCH –Flash Chamber (Insulated); PWO-Power Output (Electrical); MX-Mixer; $N_2$=Nitrogen; $T_{Aair}$=Temperature of Aair.

8. Terminologies

In this invention, the following terminologies are used with definition/meaning given below:

Hybrid Power Plant—-—It refers to the combination of two closed partial cycles together; one being a vapor power cycle and the other a reversed power (refrigeration) cycle, with both cycles sharing the same working fluid as they are interconnected by a common expander.

Binary Power Plant—It refers to the combination of two power cycles together by an interconnecting heat exchanger, where the methane power cycle acts as the topper cycle and the nitrogen hybrid power cycle as the bottomer cycle.

The 'Flash Chamber' in this invention refers to the insulated tank that collects the wet vapor from the exhaust of the turbine, and separates it into the saturated liquid and saturated vapor phases.

The 'Feed Pump' is the cryo-pump that compresses the saturated liquid to the injection pressure of the system.

The 'Polytropic Compressor' in this invention refers to the positive displacement compressor that compresses the separated saturated vapor from the flash chamber, using the compressed saturated liquid as coolant.

The 'Interconnecting Heat Exchanger' is a counter-flow heat exchanger with the fluids flowing in opposite direction, where it acts as a condenser for the topper cycle and an evaporator for the bottomer cycle.

The 'Ambient Heat Exchanger' is the component of the system where the engine gets its heat energy from the surroundings.

The 'Receiver' is a vapor filled chamber which minimizes pressure surges in the system due to changing power demands in the turbine engine.

The 'Expansion Turbine' is the turbo-Expander which expands the gas from a high pressure to a low pressure with the production of work. It is the main component that produces the power of the engine.

The 'Super Critical Vapor' is the state of a vapor with pressure and temperature above the critical state of the gas.

The 'Wet Vapor' is the mixture of both the liquid and vapor phases together.

The 'Injection State' is the final state reached by the working fluid in the system, prior to expansion in the turbine.

For practical applications of our invention the terms that are very important are as follows:

$T_1$=injection temperature (at a supercritical temperature).

$P_1$=injection pressure (at a supercritical pressure).

$T_2$=temperature of wet vapor at outlet of the turbine TE1.

$T_y$=mixture temperature after mixing before the entrance to the HEX and at the injection pressure.

$T_6$=temperature of the polytropically compressed vapor at outlet of the polytropic compressor before mixing and at the injection pressure $P_1$.

Single hybrid (specific) power output=60.63 KJ/kg$^{-90}$ KJ/kg of $N_2$.*

Binary hybrid (specific) power output=77.79 KJ/kg$^{-115}$ KJ/kg of $N_2$.*

*Depending on the $T_1$, $P_1$ and $P_2$.

9. SPECIFIC (DETAILED) DESCRIPTION

9.1. The Present Invention

Power generation process flow: Liquid $N_2$ (which is the first component of the working fluid) is drawn from the highly insulated cryostat (FIG. 14) and isentropically compressed to the injection pressure $P_1$. The vapor "(the second component of the working fluid)" is drawn to the polytropic screw compressor (FIG. 7b, FIG. 14) where the ejected heat during the polytropic compression of the vapor is absorbed by the compressed liquid with increase in its enthalpy, where the work of compression is reduced significantly. Then the two fluids are mixed in the mixer (FIG. 14). From the mixer the mixed fluid enters the heat exchanger (FIG. 13, FIG. 14). Air is blown through the heat exchanger (FIG. 13) and the high-pressure mixed fluids absorb thermal energy and increase its temperature and enthalpy with the same pressure. The fluid then undergoes turbo-expansion whereby output work is derived. It can drive a dynamo to generate electricity or a mechanical shaft for automobile transportation. Instead of air, water also can flow through the heat exchanger where the cold nitrogen mixer absorbs heat from the flowing water.

9.2. Theoretical Considerations

Our new hybrid power cycle for clean power generation and transportation using only ambient heat and no fuel is to utilize the atmosphere or river/ocean water as a heat source to vaporize and super-heat the cryogenic fluid for use in a thermal power cycle. In this invention a new thermodynamic cycle known as the "Hybrid Cycle" is now proposed. The Hybrid cycle is the combination of two closed partial cycles together; one being a vapor power cycle and the other a reversed power (refrigeration) cycle, with both cycles sharing the same working fluid as they are interconnected by a common expander TE1 in FIG. 1. In short, Thermodynamic Cycle Hybridization is the process where a power cycle and a refrigeration cycle sharing the same working fluid are combined. In this invention, the working fluid in the partial cycles, which is a fluid with critical temperature usually below the ambient temperature (i.e., cryogen) (liquid nitrogen) will recombine after the absorption of heat in the power cycle and ejection of heat in the refrigeration cycle at the inlet to their common expander (i.e., Injection State), prior to expansion. The expanded-fluid must be in the state of a wet vapor, where the saturated liquid/vapor mixture is separated in a flash separation chamber FC in FIG. 5, at the outlet of the expander after expansion. The saturated liquid goes to the partial vapor power cycle, where it is isentropically compressed by a feed pump PP$_1$ in FIG. 1 to the injection pressure of the system, which is usually above the critical pressure of the liquid; whereas the saturated vapor goes to the partial refrigeration cycle where it is also compressed by a polytropic compressor PC in FIG. 1, which is depicted by the schematic block diagram of FIG. 7b, to the same injection pressure to continue the flow through the hybrid cycle.

A diagrammatic sketch of a simple hybrid power plant is represented in FIG. 1, accompanying by the T–s diagram in FIG. 2. In the diagrammatic sketch of FIG. 1, it is observed that the process path 1-2-3-4-r-1 represents the partial vapor power cycle and the process path 1-2-5-6-1 represents the partial refrigeration cycle. In this simple hybrid power plant shown in FIG. 1 and FIG. 2, we can see that the working fluid undergoes the following series of internally reversible processes at steady-state. Process (1-2) is the isentropic expansion of a unit mass flow (1.00 kg) of compressed vapor at state 1 to a wet vapor at state 2 by an expander (TE1) in FIG. 1 i.e., turbine or reciprocating engine. The energy transfer is the work output by the turbine (W12) given as $$Wt = (h1 - h2),$$

$$\text{where } h2 = hf2 + x2hfg2$$

Process (2-5) is the separation of the wet vapor at state 2 to saturated vapor at state 5 in a flash chamber (FC) in FIG. 1 to commence the partial refrigeration cycle.

9.2.1. Estimation of the Quality x of the Wet Vapor:

The mass separation here is given by the quality (x) of the wet vapor or dryness fraction, where the specific entropy s2=s1, therefore, $$x = x_2 = \frac{s_2 - s_{f2}}{s_{fg2}}$$

Hence the mass fraction of the saturated vapor is x kg.

Process (2-3) [FIG. 1 and FIG. 2] is the separation of the wet vapor at state 2 to saturated liquid at state 3 also in the flash chamber to commence the partial vapor power cycle. Here the mass fraction of the saturated liquid is (1−x) kg. Process (3-4) [FIGS. 1 and 2] is the isentropic compression of the saturated liquid at state 3 by a pump (PP$_1$) in FIG. 1 to state 4 in the compressed liquid region, corresponding to the super-critical operating pressure of the system. The energy transfer is the work input to the feed pump (W34) given as $$Wp = (1 - x)v_3(p4 - p3) = (1 - x)(h4 - h3);$$

where (1−x) kg is the fractional mass flow in the partial vapor power cycle and $v_3$ is the specific volume of the saturated liquid at state 3.

9.2.2. Reduction of Polytropic Compression Work with Cooling in the Polytropic Compressor:

In the T–s diagram FIG. 2 of the hybrid cycle, the polytropic compression Process (5-6) is to achieve an overall reduction in compression work of the saturated vapor. So, Process (5-6) is the polytropic compression of the saturated vapor at state 5 by a polytropic compressor (PC) in FIG. 1 to state 6 in the super-critical vapor state. The energy transfers are the work input to the polytropic compressor (W56) given as Wc(polytp)=(x) [n/(n−1)][(p6v6-p5v5)] and the polytropic heat ejection (Q56) give as $$Qout(polytp) = (x)\{(h6 - h5) - [Wc(polytp)]\}[2, 14, 16, 25].$$

(Where n is the polytropic index).

Process (4-r) is the heat transfer to the compressed liquid coolant from the polytropic compression process (5-6) of the vapor in the polytropic compression. The energy transfer is the heat being added (Q56) given as $$Q4r = (1 - x)(hr - h4),$$

$$\text{which is equal to. } Qout(polytp) = (x)\{(h6 - h5) - [Wc(polytp)]\}$$

$$\text{Hence } Q4r = Q56.$$

Process (r-1) is the heat transfer to the working fluid from the surroundings, as it flows at constant pressure through the ambient heat exchanger (HE1) of FIG. 1. The energy transfer is the heat being added (Qr1) given as $$Qin(1) = (1 - x)(h1 - hr).$$

Process (6-1) is the heat transfer to the working fluid from the surroundings, as it flows at constant pressure through the ambient heat exchanger (HE2) of FIG. 1. The energy transfer is the heat being added (Q61) given As $$Qin(2) = (x)(h1 - h6)$$

This gaseous working fluid is mixed in a receiver (R₁) in FIG. 1, prior to the expansion in their common turbine (TE₁) that minimizes pressure surges in the system due to changing power demands in the turbine engine. The mass transfer here is the combination of (1−x) kg mass in the partial power cycle state 1 and (x) kg mass in the partial refrigeration cycle state 1 to give unit mass of 1.00 kg in state 1, prior to expansion in their common turbine. The energy transfer is the addition of the partial enthalpies; and by applying the conservation of mass and conservation of energy principles, the mass and energy balances at steady state to give $$(1 - x)h1 + (x)h1 = h_1.$$

The net-work (wnet)$_{output}$ for this power cycle will therefore be $$(wnet)\,\text{output} = (W12) - (W34 + W_{56}) =$$

$$(h1 - h2) - [(1 - x)(h4 - h3)] + (x)[n/(n - 1)][(p6v6 - p5v5)].$$

And the total heat supplied (Qinput) input is given as $$(Qin\,\text{(total)}) =$$

$$(Qin(1)) + (Q_{in\,(2)}) = (Qr1) = (Q61) = (1 - x)(h1 - hr) + (x)(h1h6)$$

The cycle efficiency is defined as $$\eta = \frac{\text{Net-work output}}{\text{(Heat supplied input)}}$$

$$= \frac{(h1 - h2) - [(1 - x)(h4 - h3)] + (x)[n/(n - 1)][(p6v6 - p5v5)]}{(1 - x)(h1 - hr) + (x)(h1 - h6)}$$

The calculation of the work and heat transfers can be carried out by using above equations and data from General Thermodynamic Relations and Tables.

Thermodynamic Analyses of the Ambient Heat Engine

9.2. a. Single Hybrid Ambient Heat Power Engine

Like most practical energy conversion systems, the actual processes employed in the Ambient Power Cycle are not reversible but they will be considered as quasi-static (idealized cycle) for the purposes of analysis, as such a cycle establishes an upper limit on the performance of the actual cycle, thus yielding valuable design data. In the analysis of the performance of the Ideal Hybrid Power Cycle FIG. 2, attention is focused initially on the systematic evaluation of specific enthalpies and other required property values at each numbered state in the cycle. In this invention, the working substance which is a cryogenic liquid will have its critical temperature below the ambient temperature, so that the working fluid can be compressed to a super-critical pressure to enhance the performance of the cycle. Liquid Nitrogen with its saturated vapor will be used as the working fluid, as it is the most used cryogen.

9.2.3. Criteria for choosing injection temperature T₁ and injection Pressure P₁: As the critical pressure for Nitrogen is 33.9 bars, any pressure greater than this can be used for the injection pressure in the system. Hence a super critical pressure P₁ greater than the critical pressure and temperature of T₁ greater than the critical temperature of nitrogen will be taken for the injection pressure and temperature respectively in this study, prior to expansion in the cycle (State 1). This is required to get enough liquid in the wet vapor from the exit of the expander for cooling of the compressing vapor in the polytropic compressor. Since a higher temperature will produce less liquid in the wet vapor, it will be unable to cool the compressing vapor in the polytropic compressor appropriately. It should be noted, for different injection pressures of the system the temperature would vary as to produce enough liquid in the wet vapor to cool the compressing vapor in the polytropic compressor adequately. The ambient temperature will be taken approximately as 300 K (26.85 C).

For the engine to function smoothly and continuously it is very important that enough saturated liquid (N₂) is generated after the turbine expansion so that the liquid can absorb the heat generated during the polytropic compression of the vapor (FIGS. 1, 3, 7*b* and 14) and thus to cool it such that the work of compression is reduced significantly. The important parameters are $P_1$, the supercritical vapor pressure and the injection temperature $T_1$ which must be higher (but not too much higher) than its critical temperature $T_{sc}$.

9.2.4. Estimation of Polytropic Compression Work with Cooling and the Final Temperature of the Compressed Vapor:

To begin the analysis, we will fix each of the principal states located on the accompanying schematic and T–s diagrams of FIG. 1 and FIG. 2 respectively. Starting at the Turbine through the various components in turn, and using Table of Cryogenic Nitrogen: State 1 is Super-Critical Vapor, where the pressure is $P_1$. We invented that $P_1$ can be anywhere from 100 bars to 200 bars and the super critical temperature is $T_1$ which depends on $P_1$. For a given $P_1$, $T_1$ can be obtained from the Table of Cryogenic Nitrogen. State 2 is Wet Vapor (Boiling-Point), where the pressure $P_2$=1.013 bars, temperature $T_2$=77.3 K; the quality x of the wet vapor is estimated as 0.61, therefore, the liquid fraction (1–x) =0.39. For smooth continuous running of the engine we estimate the turbine work output for 1.00 kg of mass flow to be 76.76 kJ.

State 3 is Saturated Liquid (Boiling-Point), where the pressure $P_3$=1.013 bars and temperature $T_3$=77.3 K.

State 4 is Compressed Liquid, where the pressure $P_4$=$P_1$. For the isentropic compression process (3-4) the work input ($W'_{34}$) is estimated at W'p=4.75 kJ. State 5 is Saturated Vapor (Boiling-Point), where $P_5$=1.013 bars, $T_5$=77.3 K. State 6 is Super-Critical Vapor, where $P_6$=$P_1$, $T_6$ is the temperature. In the (T–s) diagram of FIG. 2, the polytropic compression work of process (5-6) can be achieved when using the compressed liquid nitrogen as the coolant.

Hence the polytropic compression work ($W'_{56}$) of process (5-6) is estimated at W'c=11.39 kJ for the second component of the working fluid (of vapor fraction 0.61) and the heat rejected (Q'56) is estimated as (Q'out) polytp=28.55 kJ Without the polytropic cooling the W'c would have been 90 kJ [1 kg working fluid] which is less than the net work output 60.6 kJ.

Since without the polytropic cooling the W'c (isentropic compression work input) would have been significantly greater than the work output 76.76 kJ of the turbine expander; hence the cycle will not be feasible. Instead of polytropic cooling, if the compression was done isentropically (no heat exchange) the temperature $T_1$ of the vapor would have risen significantly higher than that with polytropic cooling and regeneration of the working fluid would not have been possible. Polytropic compression enables the vapor to absorb energy sufficiently from the ambient air or water.

Therefore, the overall hybrid cycle compression work input for 1 kg working fluid $$(W'c + W'p) = (11.39 + 4.75) = 16.14 \, \text{kJ}$$

Which is much lower than the overall expansion work output (Wt)=76.76 kJ.

These calculations are based on 100% efficiencies of pump. Compressor and turbine.

9.2.5. Zero Heat-Rejection to the Surroundings:

Hence this hybrid cycle will be a very viable power cycle. The heat transfer output from the compressing vapor is never rejected to the surroundings, but to the compressed liquid coolant in the partial vapor power cycle, as it (the compressed coolant) acts as a refrigerated sink for the hybrid power cycle. Hence the coolant is heated in the Polytropic Compressor by the added heat (Q'56) from state 4 to state r, process (4-*r*) in FIG. 1.

The heat supplied input (Q'r1) from the ambient surroundings process (r-1) is illustrated by the heat exchanger (HE$_1$) in FIG. 1, as the compressed liquid is heated from state r to state 1 is estimated at (Q'in) 1=43.57 kJ Since the exit temperature $T_6$ of the polytropically compressed vapor is less than the injection temperature $T_1$, it is heated from state 6 to state 1 the injection state to complete the cycle. Hence the heat supplied input (Q'61) from the ambient surroundings process (6-1) is illustrated by the heat exchanger (HE$_2$) in FIG. 1, as the polytropically compressed vapor is heated from state 6 to state 1 is estimated at (Q'in) 2=17.06 kJ Therefore, the overall heat supplied input (Q'in) by the ambient surroundings to the power cycle is $$(Qin(\text{total})) = (Q'in)1 + (Q'in)2 = 43.57 + 17.06 = 60.63 \, \text{kJ}$$

The exiting coolant and the exiting polytropically compressed vapor from the polytropic compressor (PC) in FIG. 1 can be combined after discharging from the compressor, since they are of same working substance at the same pressure so that both take the heat from the ambient when passing through the same heat exchanger. Let the final state of the combination be y, therefore, the enthalpy of the 1.00 kg of mass of the combined working fluid at state 'y', which temperature is estimated to $T_y$ will be equal to the sum of the partial enthalpy of the coolant at state 'r' and the partial enthalpy of the polytropically compressed vapor at state 6; see the nitrogen hybrid power section of the binary plant of FIG. 3.

Also, the overall heat supplied input (Q'in) by the ambient surroundings to the power cycle for process (y-1) is estimated at (Q'in)=60.62 kJ (This is same as the above calculated value)

Since the heat transfer output (Q'out) polytp from the compressing vapor is not rejected to the surroundings, but absorbed by the cycle itself, then the overall heat output (Q'out) of the power cycle to the surroundings will be zero. This is a very interesting situation as all conventional power plants must reject heat energy to the surroundings as the heat sink. Since the hybrid power-cycle is composed of two separate partial cycles; one a partial refrigeration cycle rejecting the heat at temperatures below ambient, and the other a partial vapor power cycle absorbing the rejected heat as a refrigerated heat sink, with the same working fluid, has made such a task possible; which have been impossible in conventional heat engines using just a "single power cycle".

Therefore, the overall heat rejected output (Q'out) to the surroundings by the hybrid power cycle is (Q'out)=0.00 kJ.

The net-work output of the power cycle is $$(W_{net})_{output} = (W_t) - \left(W'_c + W'_p\right) = (76.76) - (11.39 + 4.75) = 60.62 \, \text{kJ}$$

and this is equal to $$(Q'\text{in}) - (Q'\text{out}) = (60.63 - 0.00) = 60.63 \, kJ,$$

the net heat (Qnet) input, as expected from the first law. (The slight difference is due to round-off).

Estimation of $(W_{net})_{output}$ is based on 100% efficiencies of pump, compressor and turbine. If the efficiencies are 80%, then $(W_{net})_{output}$ is estimated to be 41 kJ. These estimates are for 1 kg working fluid. Following above methods it can be easily shown that the above output depends on $P_1$, $T_1$, $P_2$ and $T_2$. By suitably changing these parameters it can be shown that the output ranges from 60-90 KJ/kg of working fluid (liquid nitrogen and its vapor) for 100% efficiency of pump, compressor and turbine. For 80% efficiency the output range is 40-60 KJ/kg. This output range ensures regeneration of the working fluid at the end of turbine expansion and thus closed cycle operation, which had not been possible before.

Since the overall mass flow through the hybrid power cycle is 1.00 kg, the specific energy of the cryogenic hybrid power plant, which is an equivalent of the energy density is 60.63 KJ/kg-LN$_2$.

The ideal cycle efficiency is $$\eta_{idea} = \frac{\text{Network output}}{\text{Heat supplied Input}} = \frac{(w_{net}) \text{ output}}{Q'_{in}} = \frac{Q'_{in} - Q'_{out}}{Q'_{in}} = 1 \text{ or } 100\%$$

Since no heat is transferred to the surroundings i.e., (Q'out)=0.00.

This is the Development of the "Ambient Heat Engine" with a new thermodynamic approach in which we combine power cycle with a refrigeration cycle working with the same cryogen amount of which remains fixed in the closed cycle. The cryogen is constantly recreated at the point power is obtained. Even though we say that in ideal conditions of our engine there is no heat rejection to the surroundings and (Q'out)=0.00 unlike any current engine technology, in real cases the net efficiency will be slightly less than 100% due to frictions of the compressors and turbo-expanders and some unwanted heat from the surroundings despite high insulation.

The above energy density value of 60.63 KJ/kg-LN$_2$ is appropriate for a closed cycle; hence the development of the Ambient Heat Engine will definitely be a significant breakthrough in engine development, as its energy source is fueled by ambient heat, which is free and in-exhaustible. With this impressive energy density value, it is proposed that this engine will commercially replace the vapor power, gas turbine and internal combustion engines in the future. Since the coolant and compressed vapor exiting the polytropic compressor, does so at a very-low temperature, its coming in contact with atmospheric air while in the tubing of an ambient heat exchanger will create the formation of intense frost and thus represents an engineering challenge. The formation of frost on sub-ambient heat exchangers increases the conductive resistance to heat transfer, occludes air-side flow passages, and contributes to structural loading (Williams et al., 1997) [22]. As a frost-free cryogenic heat exchanger will contribute immensely on the performance efficiency of an ambient heat engine, it is thereby very necessary to reduce or eliminate the formation of frost. This can be done by improved tubing design of the heat exchanger as its depicted in FIG. 10a, FIG. 10b, Fig. A.

For zero-heat rejection to the surroundings and for the engine operation to be continuous and stable with a fixed amount of the working fluid in the cryostat (FIG. 1, FIG. 9, FIG. 14) our analysis shows that the amount of the liquid content (fraction, 1−x) of the working fluid (liquid+vapor)

should be such that it can cool the vapor (fraction x) during polytropic compression so as to reduce the compression work input significantly.

9.2.6. Equipment for Clean Power Generation Using Ambient Thermal Energy

We can utilize the invention described above (pages 23-31, sections 9.1, 9.2 and others) to generate clean power using ambient thermal energy as energy source and liquid nitrogen and its vapor as the working fluids. An equipment suitable for generation of clean power is described in full in FIG. 1 under the title: "Schematic of a single Hybrid Power Plant". The descriptions of the relevant components are all given in FIGS. 5-11 with FIG. 11 showing the schematics of the block diagram of an ambient thermal energy power plant. The air flow rate depends on ambient temperature and the temperature drop of the air exiting from the heat exchanger. We have given ways to determine the air flow rate and the cryogen flow rates in sections 9.2.D to 9.2.F. FIG. 11 is a block diagram that shows schematically the main equipment of an Ambient Heat Engine Electric Power Generation Plant in accordance with the invention described in pages 23-31 sections 9.1, 9.2 and sections 9C to 9F.

Since the injection temperature $T_1$ must be made low for the production of enough liquid phase (i.e., 38.69% of liquid mass) in the wet vapor after expansion in their common expander, to act as coolant in the polytropic compression; the heat energy present in the surrounding ambience of temperature of about 300 K will not be efficiently utilized, thus producing a lower engine power output. To utilize effectively the ambient heat for increased power production, the working fluid is used as a heat sink (bottomer) for a cascaded topping cycle. This added topping cycle is to ensure that the ambient heat is highly utilized and the temperature at which the working fluid is entering the ambient heat exchanger is also higher, as to reduce the formation of frost. This ambient thermal power technology will work well if the ambient temperature is in the range of −80° C. (193 K) to 80° C. (353 K). To keep the same energy density with the same heat exchanger, the air flow rates have to be adjusted as the temperature of the ambient air or water varies. The heat exchanger dimensions/structure and air flow rate can vary depending on ambient temperature, the temperatures and pressures of the compressed cryogen and the desired power output.

We see above that all engine parts are working between ambient temperature and temperatures well below 0° C. Thus, there is no need of water as in conventional power engines using coal, oil and nuclear fuel. It also remains to be seen that there is no heat rejection to the surroundings as in conventional engines (including future thermionic energy converters. We also see from the above that there is no emission to the environment and the power generated is 100% clean. If the temperature of the compressed LNV vapor in the polytropic compressor can be cooled below $T_6$, it is possible to have the temperature of the combined LNV and LN$_2$ below $T_y$ and then if the heat exchanger can be designed so that the injection temperature $T_1$ is still the same, we may get power higher than 60.63 KJ/kg-LN$_2$ in the closed cycle operation with the single hybrid mode. We discover at this power output rate the engine will run continuously provided the cryostat and the flash chamber are well insulated using the current state-of-the-art techniques available in the market. In reality, the injection temperature of the mixture at the exit of the heat exchanger, Hex (Fig. A) does not have to be precisely at $T_1$ corresponding to $P_1$. It can vary within a small range+5 K. The heat exchangers are described in FIGS. 10*a*, 10*b* and 13. See also sections 9.2.D to 9.2.F for further description on "ambient heat power engine".

9.2. B. Binary Hybrid Ambient Heat Engine

The components and structure of the Binary Hybrid Ambient Heat Engine are given in FIG. 3 with FIG. 4 describing the Temperature-entropy of the working fluid methane during the engine operation cycle.

In this second study, Methane ($CH_4$) gas will be taken as the working fluid (topper) for the topping cycle. This ($CH_4$) is the $3^{rd}$ component of the working fluid. A diagrammatic sketch of a simple binary hybrid power plant of the ambient heat engine is represented in FIG. 3 and the T–s diagram is represented in FIG. 4, using ($CH_4$) as the working fluid for the topping cycle. As the regenerator effectiveness ($\eta_{reg}$) of the counter-flow interconnection heat exchanger can never be 100%, the temperature of the exiting nitrogen working fluid will always be lower than the temperature of the entering methane working fluid. In the invention, we find that the injection pressure of methane gas in the topping binary cycle can be around 80 bars and the injection temperature at 275 K (about 25 C difference with the ambient temperature of 300 K).

We can see that the working ($CH_4$) fluid undergoes the following series of internally reversible processes at steady-state. Process (a-b) is the isentropic expansion of super critical vapor at state 'a' to a supe-heated vapor at state 'b' by an expander ($TE_2$) in FIG. 3 i.e., turbine or reciprocating engine. The energy transfer is the work output by the turbine (Wab) for a mass flow of ma kg, is given as $$Wt = ma\,(ha - hb).$$

Where the specific entropy sb=sa. Process (b-c) is the condensing of the super-heated vapor at state 'b' to saturated liquid at state 'c' in a counter flow interconnecting heat exchanger ($HE_3$) in FIG. 3. The energy transfer is the heat being rejected (Q'bc) given as $$(Q'\text{out})CH_4 = m_a(hb - hc).$$

Process (c-d) is the isentropic compression of the saturated liquid at state 'c' by a pump ($PP_2$) in FIG. 3 to state 'd' in the compressed liquid region, corresponding to the operating pressure of the system. The energy transfer is the work input done on the feed pump (W'cd) given as $$W'p = m_a v_c(p_d - p_c) = m_a(h_d - h_c);$$

Where $v_c$ is the specific volume of the saturated liquid and ma kg is the mass flow in the $CH_4$ topping cycle. Process (d-a) is the heat transfer to the working fluid from the surroundings, as it flows at constant pressure through an ambient heat exchanger ($HE_4$), which is connected to a receiver ($R_2$) in FIG. 3 filled with compressed vapor that minimizes pressure surges in the system due to changing loads in the turbine engine; here it is heated from state 'd' to super-heated vapor at state 'a'. The energy transfer is the heat being added (Q'da) given as $$(Q'\text{in})CH_4 = ma(ha - hd).$$

To begin the analysis, we will fix each of the principal states located on the accompanying schematic and T–s diagrams of FIG. 3 and FIG. 4 respectively. State a (FIGS. 3 and 4) is Super Critical Vapor @Ta=1.85 C (275 K). In the interconnecting heat exchanger ($HE_3$) in FIG. 3 of the binary cycle, the $CH_4$ working fluid condenses from super-heated vapor at state 'b' to saturated liquid at state 'c', given as process (b-c); whilst the $N_2$ working fluid is heated from state 'y' to state '1', the exit temperature which is equivalent to the injection temperature $T_1$ of the nitrogen hybrid cycle at pressure $P_1$, which is about $\ominus$ C below the condensing temperature of the methane topping cycle, given as process (y-1).

The relation for the energy transferred from the $CH_4$ cycle to the $N_2$ cycle for the system in FIG. 3 can be obtained by applying the mass and energy balances to a control volume enclosing the interconnecting heat exchanger. For steady state operation, with negligible heat transfer with the surroundings, and no significant changes in kinetic and gravitational potential energies. Starting at the Turbine through the various components in turn, and using Table of Properties of Methane we get Pa, Pb Pc, Pa. Using $T_1$ the nitrogen injection temperature around 160K, we estimated from above theoretical invention that (W't) $CH_4$=19.87 KJ and (Q'in) $CH_4$=77.79 kJ. (W p) $CH_4$=2.72 kJ. (Wnet output) $CH_4$=(W't) $CH_4$–(W'p) $CH_4$=19.87-2.72=17.15 kJ. the heat supplied (Q'da) in the ambient heat exchanger ($HE_4$) in FIG. 3 of the $CH_4$ topping cycle is estimated at (Q'in) $CH_4$=77.79 KJ/kg of $N_2$.

Since no heat is supplied by the ambient surrounding to the $N_2$ hybrid power cycle; as the heat rejected (Q'bc) in the condensation of the $CH_4$ working fluid, is absorbed by the heat transfer (Q'yl) of the $N_2$ working fluid in the counter-flow interconnecting heat exchanger; hence the overall heat transfer to the surroundings by the binary cycle will also be zero. Therefore, (Q'out) binary=0 The work transferred to the $CH_4$ feed pump is estimated at (W p) $CH_4$=2.72 kJ.

The net-work output for the $CH_4$ topping power cycle is then $$(Wnet\text{ output})CH_4 = (W't)CH_4 - (W'p)CH_4 = 19.87 - 2.72 = 17.15 \ kJ.$$

The net-work output for the $N_2$ hybrid power cycle is already given as (Wnet output) $N_2$=60.63 kJ.

Therefore, the overall net-work output of the binary power cycle is (wnet output) binary=(Wnet output) $CH_4$+(Wnet output) $N_2$=17.15+60.63=77.78 KJ, and this is equal to $$[(Q'\text{in}) - (Q'\text{out})]\ \text{binary} = (77.79 - 0.00) = 77.79 \ kJ,$$

the net heat (Qnet) input, as expected from the first law. (The slight difference is again due to round off).

The ideal cycle efficiency of the binary power cycle is $$\eta\text{ideal} = [\text{Overall net-work output}]/[\text{Overall heat supplied input}] =$$

$$(wnet \text{ output}) \text{ binary}/(Q'\text{in}) \text{ binary} =$$

$$[(Q'\text{in}) - (Q'\text{out})] \text{ binary}/(Q'\text{in}) \text{ binary} = (77.79 - 0)/77.79 = \text{Unity}$$

The ideal cycle efficiency of the binary power cycle is also unity, as no heat is again transferred to the surroundings, i.e. (Q'out) binary=0.00. The energy density of the above binary (LN$_2$-CH$_4$) system is 77.79 KJ/kg-LN$_2$; which shows an effective increase of about 17.16 KJ/kg (28.30%) over that of the LN$_2$ hybrid power cycle of 60.63 KJ/kg-LN$_2$.

As power delivered=(energy density) x (mass flow rate); the above energy density of 77.79 KJ/kg-LN$_2$ means that when a mass flow rate of 1.0 kg/s of nitrogen flows in the bottomer, the binary system will be producing a power output of 77.79 kw; the corresponding methane flow rate is found to be 0.145 kg/s.

The ideal cycle efficiency of these power cycles has been shown to be unity, meaning that the overall heat supplied input is entirely converted into an overall net-work output, since the heat transfer output to the surroundings is zero; this can be referred to as "Thermodynamic Power Cycle Perfection".

With an excellent cooling in the Polytropic Compressor, it is proposed that the exit temperature of the polytropically compressed vapor in process (5-6) of FIG. 1, of the cryogenic hybrid power cycle can be reduced to near critical temperature; thus, significantly reducing compressor work. This will remarkably increase the energy density of such a system. Hence the eventual development of these power systems will lead to tremendous advances in automotive and power generation applications. Importantly with improved design, a reciprocating polytropic compressor "without clearance" can be used; if the reciprocating compressor can be configured to maximize heat transfer during the compression stroke; since the heat and work transfers to the properties of the fluid at inlet and outlet are very similar to a steady state open flow polytropic compressor, where the polytropic work done (W$_{polytp}$) is given as $$w_{polytp} = [(n/(n-1)](p_2v_2 - p_1v_1).$$

Where n is the polytropic index

Hence the commercial implementation of a binary power plant using (CH$_4$) as working substance will definitely increase the economic value of this gas. An important role of this engine is that it can do the functions of a refrigeration plant. This is possible when the ambient heat exchanger of a hybrid cryogenic heat engine or a binary-hybrid cryogenic heat engine running at temperatures well below any ambient temperature replaces the evaporator in a refrigeration system to produce the refrigeration effect needed for cooling. Therefore, it can then provide both refrigeration and air conditioning at a domestic and industrial capacity. This then shows that our novel technology can perform refrigeration/air conditioning and also deliver useful work. Above formulation assumes that the efficiencies of pump, polytropic compressors and turbo-expanders are all unity (100%). In practical cases they deviate from this ideal efficiency. This may reduce the overall efficiency of our engine to a lower value than 100%. However, a remarkable part of the invention to note is that there is no heat delivered to the surrounding. So, even with lower efficiencies of pump and polytropic compressors, the irreversible heat generated due to friction will be absorbed by the liquid N$_2$ and the vapor and may therefore be utilized in the work output. Thus, the final efficiency of the engine may solely depend on the turbo-expander efficiency.

Figure 10:
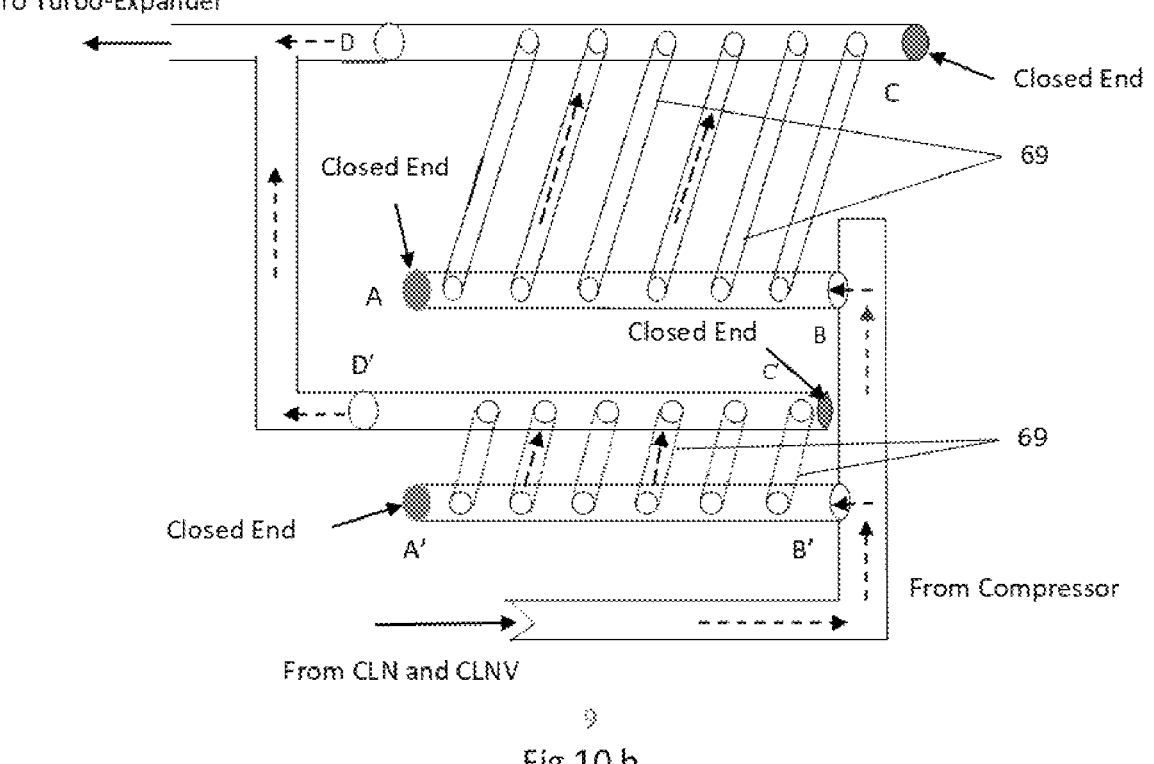

9.2. C. Heat Exchangers (FIGS. 10$a$,10$b$ and 13).

Above we have shown thermodynamic principles and the methods of producing output power from ambient energy using single hybrid and binary hybrid technologies. In the single hybrid technology liquid nitrogen and its saturated vapor draw energy from the ambient heat and convert it to output power in closed cycles, i.e., liquid nitrogen and its saturated vapor (LN+LNV) are regenerated when the power is delivered. In the binary hybrid technology this is done using LN+LNV and liquid methane. The key to this power conversion using a fixed amount of the cryogen(s) is the heat exchanger through which the cryogen flows and draws energy from the ambience. While many types of heat exchangers are possible and will be invented in future to make use of this invention in order to produce abundant clean energy from the ambient environment, we find that the following heat exchanger would be very practical and highly efficient and cost-effective.

In both the hybrid ambient heat engine and binary hybrid ambient heat engine, heat is derived from the ambient air flow. This can be achieved by a) the surrounding air flow through the heat exchangers (FIGS. 10$a$, 10$b$ and 13); b) the flow of a fixed amount of air in closed cycles through a secondary heat exchanger where liquid cryogen is not flowing. The first one has the advantage of changing the heat input and therefore the output power, by changing the air flow rate through the heat exchangers. However, it may suffer from a disadvantage of frost formation in the heat exchangers if the air-humidity is high. In the second type the frost formation is eliminated completely as the fixed amount of air can be completely moisture free.

9.2. D. Single Hybrid Ambient Heat Engine

Among the many possible heat exchangers, we have shown in FIGS. 10$a$ and 10$b$ the two types in this invention. In FIG. 10$a$ the compressed liquid nitrogen (CLN) and compressed liquid nitrogen vapor (CLNV) at T$_y$ enters through tubes hollow rectangular plates arranged in stacks. Air either flows automatically (as in vehicles in motion) or blown by fans (in the case of power generators). In the heat exchangers the air flow is opposite to the flow of the cryogenic fluids (CLN and CLNV) (FIG. 13).

Modeling the Heat Exchanger:

In Fig. A:

t=thickness of heat exchanger plate

W=width of heat exchanger plate

L=length of heat exchanger plate

T$_{ai}$=Inlet air temperature

Tao=Outlet air temperature

Tni=Inlet N$_2$ temperature ~ Ty

T$_{no}$=Outlet N$_2$ temperature ~ T$_1$ d$_n$=Separation of the parallel plates in a given parallel plate chamber of (FIG. 10$a$) or in FIG. 13 (those of 1-8')

d$_a$=Closest separation between two parallel plate chambers (FIG. 10$a$) or in FIG. 13 between 1 and 2 etc. through which the air flows.

η Effective heat absorption coefficient of each plate surface

V$_a$ Air flow speed between two parallel plate chambers.

$V_n$ Liquid nitrogen and vapor flow speed within a chamber
$\rho_n$ Density of liquid nitrogen and vapor
$\rho_n$ Density of air.
H Efficiency of heat collection from the air by the liquid nitrogen and its saturated vapor.

Temperature of air at a given x is assumed to be the same across the thickness dx and $d_n$ respectively $$T_{xa} = \frac{(T_{ai} - T_{a0})}{L} x \quad (1)$$

$$T_{xn} = \frac{(T1 - Ty)}{L}(L - x)$$

The heat flow Q across the length dx (Fig. A) where $\Delta\Theta = T_{xa} - T_{xn}$ is $$Q = \int_0^L \frac{2KW(T_{xa} - T_{xn})dx}{t} dx \quad (2)$$

Now Q is also equal to $$Q = d_n WV_n\rho_n(T_1 - T_y) = \eta d_a WV_a\rho_a(T_{ai} - T_{ao}) \quad (3)$$

Equations (1)-(3) enable us to design the thickness (t) of the plates, the flow speeds of the liquid nitrogen/vapor and air.

In the case of power generators, the air has to be blown by a fan(s) across the gap da between the chambers and the air flow direction is opposite to the liquid nitrogen flow direction. Parallel plate will be such that the temperature $T_{xn}$ is uniform over the plate separation dn. From the above, the length L can be determined, if we are to generate P (KW) of electric power, and if the efficiencies of the turbo-expander and the dynamo are $\eta_{Tx}$ and $\eta_{dy}$, then $$Q = P/\eta_{Tx}\eta_{dy}$$

The total amount of liquid $N_2$ (plus vapor) to be flown:

$$m = Q/60 \text{ kg/s,}$$

as each 1 kg of liquid $N_2$, thermodynamically generates around 60 kJ of output energy as shown in the section. The amount of liquid $N_2$ passing through each heat exchanger is $d_n Wv_n\rho_n$. So, the number of heat exchangers needed is:

$$N = m/d_n Wv_n\rho_n$$

9.2. E. Weight of a Single Heat Exchanger

The liquid nitrogen will pass through the heat exchanger part EFGH at pressure $P_1$. The plates need be strong not to buckle at that pressure over a length of 2 m. We take the plate dimensions to be 2 m×0.5 m×2 cm, with 2 cm as the gap through which LNV passes. We allow the LNV to flow at speed 2 m/s along the length (2 m) of the plates. The length should be such that the liquid $N_2$ absorbs sufficient heat from the air (flowing opposite to the LNV flow direction) in the flow condition to raise the temperature of the LN and its saturated vapor at pressure $P_1$ from $T_y$ to $T_1$. A 5 mm thick hard-aluminum plate should be strong enough for this. The mass of the two plates for a heat exchanger is 2 m×0.5 m×5×10⁻³ m×2700 kg/m³×2=27 kg, accessories including others, the weight ~ 40 kg (say).

If the plate separation is 2 cm, and the velocity of liquid $N_2$ is 2 m/s, then the (mass) flow rate of liq. Nitrogen and its saturated vapor=0.5 m×2 m×10⁻²×2 m/s×900 kg/m³=18 kg/s Even though we have shown that (if all frictional losses of the compressor, pump, and the dynamo are excluded) the thermodynamic efficiency of conversion of energy from the air to mechanical power is 100%, there will be some losses due to frictions of the compressors and turbo-expanders and heat losses or unwanted input from the surroundings. To generate P=100 MW with turbo efficiency 85% and dynamo efficiency 85% the net amount of heat energy Q to be absorbed from the air is $$Q = P/\eta_{Tx}\eta_{dy} = 100/(0.85 \times 0.85) = 138.5 \text{ MW}(MJ/s)$$

The thermodynamic estimation of power output in the single hybrid engine has been proven above to be around 60 kW/kg-LN$_2$, so the amount of liquid nitrogen to pass=138.5×10³ kW/60 kJ.kg⁻¹⁼²³⁰¹ kg/s; thus the number of heat exchanger units (2 m×0.5 m×2 cm) needed for 100 MW power output=2301 (kg/s)/18 (kg/s)=128, the total empty weight=128×40=5.52 tons.

The loaded weight of the heat exchangers at any moment would be 5.52+2.3 tons=7.82 tons If we take each heat exchanger to be made of 5 mm hard aluminum plates, the total weight of heat exchangers for 100 MW generator would be 3.2×5/3+2.3=7.7 tons. With compressors, turbo expanders and Dewar we expect the total weight of the 100 MW ambient power generator not to exceed 25 tons. Thus, the output power per unit mass is expected to be 4 MW/ton. Which is higher than any conventional power generating machines as can be seen from the following comparison. For each of the 12.5 MW power generator the weight of the heat exchanger is expected to be ~7.52/8=0.94 ≈1 ton. Considering the structures to mount the heat exchangers we can double this weight to 2 tons. The total weight of the 12.5 MW power generator we expect to be below 10 tons. This is considerably lighter than the heat exchangers of 10-13 MW conventional power generators (with coal/natural gas etc. [39]. For example: A 10 kWp solar photovoltaic plant requires 30 pieces of 330Wp panels and space of 80 square meters.

Weight of Solar Panels: 27×30=810 kg

Mounting structure including clamps: Aluminium-120 kg GI-300 kg

Cables, Conduits and Trays: Around 50 kg

Total Weight: 980 kg (Al mounting) & 1160 (GI mounting) for 10 kW solar panels.

Weight per Square meter: 12.25 kg/m² (Al mounting) & 14.5 kg/m² (GI mounting) [35a]

Globally, as of 2017, around 70 metric tons of glass, 56 metric tons of steel and 47 metric tons of aluminum were required to manufacture a one-megawatt solar photovoltaic plant. Other materials were needed in smaller proportions, such as silicon, copper, and plastic. [35b]

The GE 1.5-megawatt model weighs in at more than 164 tons; the tower alone weighs about 71 tons. Sep. 19, 2017

5 MW gas turbine power generation system has

Length 20 feet |6.1 meters

Width 7.9 feet |2.4 meters

Height 9.8 feet |3 meters

Weight 130,000 lbs |58,967 kg. It weighs over 58 tons.

9.2. F. The Air Flow Speed

To generate P=100 MW we divide the whole 100 MW plant into 8 smaller units, each unit producing 12.5 MW. Each 12.5 MW unit will have 16 heat rectangular heat exchanger-slab each of dimensions (0.5 m×2×10⁻² m×2 m), through each of which will pass 18 kg LNV per second at $P_1$ pressure. The total mass of LNV (liq. $N_2$ plus its saturated vapor) to pass through the 16 slabs of each unit of 12.5 MW (net output power) power generating plant section will be (2301/8)=288 kg/s. Thus, the number of heat exchanger slabs for each unit is 16. The total volume of air to be blown over the surfaces (two faces for each heat exchanger) these 16 heat exchangers depend on the temperature drop $\Delta T = T_{ao} - T_{aj}$. We can allow anti-frost coating to be sprayed on each surface of each heat exchanger which will hang vertically with long side parallel to the ground and to the direction of air flow. We should be able to let $\Delta T$ to be −60° C. This is especially so if the $T_{ai} \sim 30$° C. so that $T_{ao} \sim -30$° C. The mean air temperature during the flow is ~ 0° C. If the air is very humid snow can still form on the vertical plate surfaces which is expected to fall by gravity, or, using a wiper (similar to the wind-shield wiper of a car) arrangement can be made to clean them off. We do not recommend $\Delta T$ to be less than −60° C. in humid environments. The total air flow rate (volume flow, $V_a$/second) through the 16 heat exchangers of each of the 12.5 MW power unit is given by:

$$V_a \rho_a C_a \Delta T = 288 (\text{kg/s}) \times 60 \ kJ/\text{kg} = 17.280 \ MJ/s;$$

$$\rho_a = 1.2 \ \text{kg}/m^3; \ C_a = 1 \ kJ/(\text{°C} \cdot \text{kg})$$

For $\Delta T = T_{ao} - T_{ai} = -60, -50, -40, -30$° C., $V_a$ turns out to be 240 m³, 288 m³/s; 360 m³/s; 480 m³/s respectively. 1 m³/s=1800 cfm (cubic feet per minute). To increase the heat absorption by LNV (passing through each plate) from the air passing through the space between two plates, we coat the outer and inner aluminum metal surface with black paint and attach fine granular carbon particles on it by spraying the carbon before the paint dries up. This will increase the heat absorption significantly. Still considering only 80% heat absorption from the flowing air by the LNV, we arrange for an increased volume flow rate from that calculated above by a factor of I/O.8=1.25. If we assume $\Delta T = T_{ao} - T_{ai} = -40$, then we should have $V_a = 360 \times 1.25 = 450$ m³/s.

9.2. G. Fan System for Blowing Air:

There are fans [31-34] that can blow 1 million cubic meters of air per hour (https://www.elektror.com/en/contact/contact-successful/ #anfrageformularEN-173). This translates to 278 m³/s. In FIG. 13 the 16 heat exchanger slabs are arranged in 8 columns with 2 heat exchanger plates in each column, placed vertically. The columns are separated by about 25 cm to 30 cm gap. The height (h) of each column is about 1.5 m. Thus, the whole box of 16 heat exchanger plates can have approximately the dimensions: (H×W×L) 1.5 m×2.5 m×2.5 m. The total weight is around 400 kg+288 kg=688 kg. There are fans capable of blowing 25000 cfm with 30" diameter. If we place 2 fans which each of can deliver 278 m³/s air, then we shall have sufficient air flow to generate a net output power of 12.5 MW. This can be done 24×7 hrs a week. We can arrange 8 of such 12.5 MW units to generate a net 100 MW power output. With a high efficiency fan delivering 110 cubic feet per minute, the total power consumption will be 10.7 kW. Thus, net output power will be 12.5-0.17~12.33MW.

9.2. H. Ambient Heat Engine Automobile Power Transmission System (AHEAPTS) for Clean Transportation.

We can utilize the invention described above (pages 23-31, sections 9.1, 9.2 and others) for low-cost clean transportation using ambient thermal energy as energy source and liquid nitrogen and its vapor as the working fluids. An equipment suitable for Ambient Heat Engine Automobile Power Transmission System is described in full in FIG. 12 under the title: "Block Diagram of an Ambient Heat Engine Automobile Power Transmission System". The descriptions of the relevant components are all given in FIGS. 5-10. The calculations of the working fluid flow rate and the air flow rate for a given power output can be obtained from descriptions given in 9.2.D-F.

9.2.1 Ambient Heat Engine Automobile Power Transmission System for Clean Transportation.

We can utilize the invention described above (pages 23-31, sections 9.1,9.2 and others) for low-cost clean transportation using ambient thermal energy as energy source and liquid nitrogen and its vapor as the working fluids. An equipment suitable for Ambient Heat Engine Automobile Power Transmission System is described in full in FIG. 12 under the title: "Block Diagram of an Ambient Heat Engine Automobile Power Transmission System". The descriptions of the relevant components are all given in FIGS. 5-10. The calculations of the working fluid flow rate and the air flow rate for a given power output can be obtained from descriptions given in 9.2 D-G.

9.3. Does the New Ambient Power Generation Technology Violate Entropy Principles?

The entropy principle demands that any realistic engine cycle would ensure either net entropy increase of the universe or net zero increase in a reversible cyclic process but never decrease the net entropy of the Universe. Our cyclic process provides a net increase in the entropy of the universe. It can be understood from the following: Compressed nitrogen absorbs energy from the flowing ambient air. The net entropy increase of nitrogen is greater than the decrease in entropy of the outgoing air because the temperature of nitrogen is much lower than that of the ambient air. Thus, there is a net increase in entropy of the nitrogen air system. Now when the compressed nitrogen with increased enthalpy undergoes turbine expansion in isentropic condition the output work is generated while the nitrogen re-condenses back to saturated liquid and saturated vapor (i.e., wet vapor). During this process the net entropy change is zero. So, there is an overall entropy increase and thus it does not violate the entropy principle.

10. Practical Applications of Our Engines:

A. Both single hybrid and binary hybrid ambient power engines can find innumerable applications, apart from low-cost continuous clean power generation and transportation on both road and land with zero emission and at much lower costs than conventional renewable energy technologies can offer. For example, the cold air exiting the heat exchangers in the clean power generators with our engines can be used for air-conditioning buildings and houses during the summertime. The clean power generators can be used to produce green hydrogen, liquid nitrogen and liquid oxygen at much lower costs. The engines should also be able to drive ships using ambient thermal energy of both air and water. The completely hazard free power generators can find immense applications in battle fields, laser guns and rail gun applications. In remote and desert places technology can find applications in clean energy generation without water and fuel. Using our earlier inventions of low-cost carbon capture [37, 38] with minimum energy, this new technology can bring a new era of carbon capture from both industries without using any energy from conventional energy sources and technologies but using only ambient thermal energy which is inexhaustible.

B. Combustion fuel free transportation: This invention can be used for future transportation powered by liquid nitrogen and ambient thermal energy without using any combustion fuel. The engine has been described in the description of FIG. 12. This type of transportation will not require electric charging or frequent re-filling of the working fluid.

REFERENCES

1. Barron, R. 1985. Cryogenic System. 2nd ed. New York, N.Y.: Oxford University Press.
2. Bejan, A. 1984. Advance Engineering Thermodynamics. Singapore: John Wiley and Sons Inc.
3. Boese, H. L. 1981. Cryogenic Power Vehicle. U.S. Pat. No. 4,294,323.
4. Boese, H. L., and T. R. Hencey Jr. 1972. Non-Pollution Motor Including Cryogenic Fluid as The Motive Means. U.S. Pat. No. 3,681,609.
5. Cooper, I., R. M. Ostermeier, and R. S. Donnelly. 1981. Feasibility Study of Condensation Flue Gas Cleaning (CFCG) System. Environ. Sci. and Tech, 23.
6. Guyer, E. C., and D. C. Brownell. 1989. Hand book of Applied Thermal Design. U.S.A.: McGraw-Hill Inc.
7. Hewitt, G. F., G. L. Shire, and T. R. Bott. 1994. Process Heat Transfer. U.S.A.: CRC Press Inc.
8. Knowlen, C., A. Herztbery, and A. T Mattich. 1994. Cryogenic Automotive Propulsion. AIAA Paper No. 94-4224: 29th I.E.C.E.E.
9. Knowlen, C., A.T. Mattich, A.P. Bruckner, and A. Hertzberg. 1998. High Efficiency Energy Conversion System for Liquid Nitrogen Automobiles. SAE Paper No. 981898. Warrendale, Pa.: SAE.
10. Knowlen, C., A. T Mattick, A. Hertzberg, and A. P Bruckner. 1999. Ultra-Low Emission Liquid Nitrogen Automobile. SAE Paper No. 992932. Warrendale, Pa.: SAE.
11. Knowlen, C., J. Williams, A.T. Mattich, H. Deparis, and A. Hertzberg. 1997. Quasi-Isothermal Expansion Engines for Liquid Nitrogen Automotive Propulsion. SAE Paper No. 972649.Warrendale, Pa.: SAE.
12. Latter, A. L., J. L. Dooley, and R.P. Hammond. 1980. Engine System Using Liquid Air and Combustible Fuel. U.S. Pat. No. 4,359,118.
13. Manning, L., and R. N Schneider. 1974. Nitrogen Vapor Engine. U.S. Pat. No. 3,786,631.
14 Moran, M. J., and H. N. Shapiro. 1998. Fundamentals of Engineering Thermodynamics. 3rd ed.: John Wiley and Sons Ltd.
15. Oduniyi, I. A. 2001. Proposed Invention of A Commercial Cryogenic Vapor Power Plant. Nigerian Patent No. RP. 14 196.
16. Oduniyi, I. A., and D. K. De. 2017. Rotational Frame Thermodynamics: An Introductory Note. Lambert Academic Publishing.

34

17. Oxley, A. J. 1980. Methods and Means for Storing Energy. U.S. Pat. No. 4,227,374
18. Reynolds, K. 1992. AC Propulsion CRX Harbinger of Things to Come: Road and Track.
19. Siege, K., and J.R. Howell. 1981. Thermal Radiation Heat Transfer. 2nd ed. New York, N.Y.: Hemisphere.
20. Twidell, J. W., and A.D. Weir. 1986. Renewable Energy Resources. Great Britain: St. Edmunds Bury Press.
21. West, C. W., L. E. Lee, and A.O. Norris. 1976. Vehicle Utilizing Cryogen Fuel. U.S. Pat. No. 4,106,581.
22. Williams, J., C. Knowlen, A.T. Mattick, and B. Hertzberg. 1997. Frost-Free Cryogenic Heat Exchangers for Automotive Propulsion. AIAA Paper No. 97-3168
23. Williamson, and F.J. Edeskuty (eds). 1983. Liquid Cryogen Vol. 1, Theory and Equipment Boca Raton, Flu
24. Xiao-li Yu, Guang-jie Yuan, Shi-chuan Su, Yan-long Jiang and Guo-bang Chen. 2002. Theoretical study on the ideal open cycle of the liquid nitrogen engine. Journal of Zhejiang University-Science A 3, 258-26 2.
25. Ceng Danling and Ao Yue. 1997. Engineering Thermodynamic Science. China High Education Press. Beijing. p. 268, p. 281
26. Ewald R., 1990. Liquid nitrogen fueled automobiles: on-board and stationary cryogenic installations. Cryogenics, 30:38-45.
27. M. C. Plummer, C. A. Ordonez and R.F. Reidy. 1999. Liquid nitrogen as a non-polluting vehicle fuel. SAE Paper No. 1999-01-2517.
28. Ordonez C. A., 1996. Cryogenic heat engine. Am. J. Phys., 64 (4) 479-481.
29. C. A. Ordonez and M. C. Plummer. 1997. Cold thermal storage and cryogenic heat engine for energy storage application. Energy Sources. 19:389-396.
30. M. C. Plummer and C.P. Koehler. 1998. Cryogenic Heat Engine Experiment. In: Advances in Cryogenic Engineering. Ed. by P. Kittel, Plenum Press New York. Vol. 43, p. 1245-1251.
31. https://superdutyfans.com/contact-us/(469) 934-6640
32. https://www.robaid.com/tech/slips-as-anti-ice-and-anti-frost-coating-for-metal-surfaces.htm
33. https://cranedepot.com/products/patterson–30-high-velocity-industrial-fan?gad=1&gclid=EAIaIQobChMI-evys5Kj_wIVaebjBx0yLwjCEAQYASABEgICOvD_BWE
34. https://www.elektror.com/en/products/industrial-blowers/large-volume-fans/35. a. [https://www.quora.com/What-is-the-weight-of-a-10-kw-solar-power-plant].
35. b. [https://www.statista.com/statistics/1118670/materials-used-manufacture-solar-pv-plant-globally/]
36. [https://www.google.com/search?q=How+much+does+a+1.5+MW+wind+turbine+weigh%3F&sa=X&ved=2ahUKEwjrvvemyfj_AhVclWoFHVGGBo4Qzmd6BAgXEAY&biw=1458&bih=730&dpr=1.25].
37. Dilip K. De and Idowu A. Oduniyi-Highly cost-effective technology for capturing industrial emissions without reagents for clean energy and clean environmental applications-U.S. Pat. No. 10,670,334 dated Jun. 2, 2020.
38. A novel cryogenic technology for low-cost carbon capture from NGCC power plants for climate change mitigation. Dilip K. De (P), Idowu A. Oduniyi and Ashish Alex Sam, Thermal Science and Engineering (1922) volume 36 1 Dec. 2022, 101495. https://authors.elsevier.com/a/1fyfC8jVwPvYPA
39. https://www.geaerospace.com/sites/default/files/datasheet-42mw.pdf.).

We claim:

1. A method to generate mechanical energy and electrical energy continuously, the method being a single hybrid thermal cycle technology to combine a power generation cycle and a refrigeration cycle, the method comprising steps of: using liquid nitrogen and a saturated vapor of the liquid nitrogen as a working fluid with an expander to generate an external power output using only ambient thermal energy of air or water; compressing a first component of the working fluid by a pump, the first component being the liquid nitrogen; compressing a second component of the working fluid by a screw compressor, the second component being the saturated vapor of the liquid nitrogen taken from a cryostat at 77K; combining the first component and the second component in a mixer; heating the combined first and second components as a mixture to a supercritical temperature $T_1$ in a heater which is a heat exchanger through which ambient air or water flows; expanding the heated first and second components of the mixture by a turbine expander to produce work output in the expander; generating a net-work output of 60.63-90 KJ/kg of nitrogen gas ($N_2$) depending on $P_1$, $T_1$ and $P_2$ with 100% efficiencies of pump, compressor and turbine, or 40-60 KJ/Kg of nitrogen gas ($N_2$) with 80% efficiencies of pump, compressor and turbine; regenerating the first component and the second component in the initial states by transferring into a flash chamber a wet vapor generated from the working fluid mixture after expansion in the turbine expander and collecting the components into a cryostat and thereby separating the first and the second components for the method to repeat in a closed cycle with a fixed amount of the working fluid.

2. The method according to claim 1, wherein a temperature of the first component entering the screw compressor is less than a temperature of the second component while the second component is under compression, thereby causing the heat generated during compression of the second component to be absorbed by the first component and thus raising the enthalpy of the first component while cooling the second component, and reducing work input (Win) to compress the second component to the supercritical pressure $P_1$, the said work input, (Win) being less than the work output received after the turbine expansion of the combined first and second component of the working fluid.

3. The method according to claim 2, wherein the screw compressor is a polytropic vapor cryogenic screw compressor to reduce the work input in compressing the gas or vapor, the polytropic vapor cryogenic screw compressor comprising: (i) a compression chamber with the a male rotor and a female rotor made of stainless steel, and a boundary surrounded by a coolant chamber, (ii) a surface boundary made of alloys of aluminium and copper for high mechanical strength and good thermal conductivity, (iii) an insulated outer side of the wall of the coolant chamber to prevent heat flow from the ambience, before placing into the compressor outer casing (housing) usually made of cast iron.

4. The method according to claim 1, wherein the first component's combination with the second component in the mixer, enabling the mixed vapor at a temperature $T_y$ lower than the supercritical temperature $T_1$ at pressure $P_1$ to absorb the thermal energy from ambient air or water which is at temperature much higher than $T_1$ when the mixed vapor passes through the heat exchanger through which either ambient air or water flows.

5. The method according to claim 1, wherein the cryostat comprises: (i) an inner metallic cylinder with reflection coatings on the inner and outer walls; (ii) three cylinders surrounding the inner cylinder of (i) with reflection coating on inner and outer walls of each cylinder and each of the intervening space outside the inner cylinder of (i) being made a vacuum, with the outer wall of the outermost cylinder and the bottom of the cryostat being covered with high thermal insulation materials; (iii) the top of the inner cylinder being fitted with a disc with provisions for three tubes, one for the said wet vapor to enter the cryostat, the second and the third tubes for drawing the liquid $N_2$ and the vapor for compression; (iv) the arrangement (i) to (iii) minimizes heat transfer from ambient environment to a cryogen inside the inner cylinder, and thus prolonging storage life of the cryogen.

6. The method according to claim 1, wherein the heat rejected by the second component is not rejected to the surroundings but transmitted to the first component, which acts as a sink for the cycle at a temperature lower than the second component, before both the first and second components of the working fluid are combined together to absorb heat energy from the ambience in the heat exchanger through which ambient air or water flows for the cycle to continue.

7. The method according to claim 1, further comprising a step of cooling the second component prior to combining the first component with the second component, wherein the cooling step comprises cooling the second component by the compressed first component by heat transfer from the second component to the first component across a conductive metal barrier separating the first and second component chambers during the step of compressing the second component in the screw compressor.

8. The method according to claim 1, further comprising a step of controlling the thermal energy transferred in the heater, which comprises changing the conditions of the working fluid by controlling a flow rate of air or water in the heat exchanger, prior to expanding the working fluid in the expander, and changing the amount of the first component which is combined with the second component.

9. The method according to claim 1, further comprising a binary hybrid power cycle technology (BHPCT), the BHPCT comprising a power generation cycle as a topping cycle with the single hybrid thermal cycle as a bottomer to achieve higher specific output power than the single hybrid thermal cycle technology, comprising of: (i) isentropic compression of liquid methane at 165K and $P_c$ bars as a third component of the working fluid in the BHPCT to a high pressure, $P_d$ bars ($P_d$>critical pressure of methane); (ii) allowing the compressed liquid pass through heat exchangers to absorb thermal energy of ambient air or water that passes through the said heat exchangers, wherein, the temperature of methane rises to a temperature $T_a$ which is above the critical temperature of methane but below the ambient temperature ($T_{amb}$), $T_a$ of 275 K; (iii) increasing the enthalpy of methane of (ii) by the absorption of thermal energy of air or water; (iv) expanding adiabatically the compressed third component of the working fluid of (iii) by a turbine-expander from (pressure $P_a$ to Pb bars), where ($P_a$=$P_a$ and $P_b$=$P_c$); (v) generating external power through the said expansion; (vi) condensing the third component of the working fluid after expansion, into a saturated liquid state at a temperature 165 K at a pressure $P_c$ bars in an interconnecting heat-exchanger that uses the working fluid of the single hybrid power cycle as a coolant (condenser); (vii) while making the third component of the working fluid of the methane power cycle as a vaporizer for the working fluid of the single hybrid power cycle.

10. The method according to claim 9, wherein the first and the second components of working fluid receives the thermal energy from condensation of the third component to saturated liquid methane at ~165 K and pressure $P_c$ instead of the thermal energy from ambience.

11. The method according to claim 9, wherein the network output a specific power density 60.63 kJ to 77.79 kJ with 100% efficiencies of compressors and turbines.

12. The method according to claim 9, wherein the energy above that of 60 KJ/kg·$N_2$, being generated during the expansion of the third component of working fluid by a second turbine, whereas the expansion of the compressed working fluid of the single hybrid power cycle to generate specific energy output of 60 KJ/kg·$N_2$ takes place by a first turbine expander in the BHPCT.

13. The method according to claim 1, wherein the technology further include generation of clean power continuously in closed cycles with a fixed amount of the working fluid using the ambient thermal energy of air or water or both without using any combustible fuel, the technology comprises the steps of: (i) compressing the working vapor (of liquid Nitrogen) to pressure $P_1$ using minimum input work such that its temperature remains significantly lower than the supercritical temperature of the working fluid $T_1$, being lower than the ambient temperature; (ii) method of reducing the work input in compressing a vapor; (iii) ensuring that the temperature $T_y$ of the mixture of the compressed liquid nitrogen and the compressed working vapor remains well below $T_1$ so as to absorb sufficient energy from the ambience; (iv) raising the temperature of the mixture from $T_y$ to $T_1$ by passing the mixture through a heat exchanger through which ambient air or water passes and thus enabling the mixture to absorb energy from the ambience; (v) expanding the compressed working fluid mixture by a turbine and receiving external work much greater than the work input in the compression of the working fluid; (vi) regenerating the working liquid and vapor in the original amounts in the initial state at the beginning of the cycle; (vii)) the initial state containing sufficient first component (liquid $N_2$) of the working fluid to be able to cool the second component (vapor) to a temperature below the supercritical temperature $T_1$.

14. The method according to claim 13, wherein the generation of clean power continuously in closed cycles using only the ambient thermal energy of air or water without using any combustible fuel with power density significantly higher than that of solar panels and wind-turbines, comprising: (i) the cryostat in which the first and the second components of the working fluid condense after the expansion of compressed working fluid and consequent clean power generation; (ii) a provision for drawing the two components of the working fluid of (i) separately and compressing them separately before combining them in a mixer, which is one of the components of this equipment; (iii) an insulated pump to compress the first component of the working fluid of (i) to a supercritical pressure $P_1$ required for generation of the power; (iv) a polytropic compressor of for compressing the second component the working fluid of (i) to a supercritical pressure $P_1$ with significantly reduced work input; (v) a mixer following this polytropic compressor wherein the said two components at supercritical pressure $P_1$ are mixed after they exit the polytropic compressor of (iv); (vi) two structured heat exchangers each capable for efficient thermal energy exchange between flowing air/water and the said compressed working fluid of (v) which enters the heat exchanger from the said mixer; (vii) fans/blowers blowing air through a heat exchanger of (vi), thus facilitating the compressed working fluid in (vi) at $P_1$ to absorb thermal energy from ambience and rise to the injection temperature $T_1$; (viii) a turbine expander to facilitate expansion of the compressed working fluid of (vii) for output power generation; (ix) a flash chamber to contain the wet vapor formed by expansion of working fluid with the turbine of (viii) before the wet vapor separates into a liquid cryogen (first working fluid) and the vapor (the second working fluid) in the cryostat; (ix) an alternator for electrical power generation.

15. The method according to claim 14, further comprising a step to increase the specific heat energy input to the single hybrid thermal cycle from the ambience, and to reduce the compression work input, thus generating a specific net-work output greater than 60 KJ/kg·$N_2$ achievable at temperature $T_y$ by increasing the length and/or the cross sectional area of the compression chamber of the polytropic vapor cryogenic screw compressor to further increasing the surface area of the compression chamber to enhance the cooling process of the said compressor for reducing the mixing temperature in the mixer below $T_y$.

16. The method according to claim 14, further comprising an equipment to augment the specific output energy 60.63 kJ of single hybrid thermal cycle technology to 77.79 kJ of binary hybrid power cycle technology (per kilogram of working fluid), the equipment comprises: (i) the equipment of single hybrid power cycle technology as the bottomer; (ii) a first turbine to generate the specific output power 60.63 kJ after the expansion of the working fluid of (i); (iii) the methane ($CH_4$) power engine as the topper, the methane ($CH_4$) power engine of (iii) comprising: (a) a second expansion turbine, which expands the methane gas at the injection state to the exhaust state at the exit of the turbine to produce the additional motive force of the engine (17.15 kJ)); (b) an interconnecting heat exchanger, which is a counter-flow heat exchanger to cool and condense the methane vapor at the exit of the turbine to saturated liquid, by the vaporizing nitrogen of (i); (c) a feed pump, which compresses the saturated liquid at the exit of the interconnecting heat exchanger to the operational pressure of the system; (d) an ambient heat exchanger, which heats the compressed liquid at the exit of the feed pump at constant pressure, to the injection temperature of the system by heat transfer from the ambient surroundings to continue the cycle.

17. The method 14, further comprising an Ambient Heat Engine Automobile Power Transmission System (AHEAPTS) based on output power generation, transmitting power from the engine to a rear wheel of a car, with provisions to alter ratio of engine speed to wheel speed, the AHEAPTS comprising: (i) all of the components excluding the alternator, to produce motive force of the engine that finally drives the transmission system; (ii) power transmission shaft transmitting mechanical power from the ambient heat engine to the transmission system; (iii) a clutch engaging and disengaging the transmission system from the engine when the engine is being driven from a standstill, and when a gearbox gear change is necessary; (iv) the gear box located between the clutch and a propeller shaft varies leverage (speed ratio and hence torque ratio) between the engine and driving wheels; (v) the propeller shaft to transmit power from the gear box to a differential; (vi) the differential to transfer the engine power to the rear wheels, and to act as a final gear reduction to a vehicle, and also making the wheels to rotate at different speeds neglecting the turn; (vii) a drive axles to finally provide power from the engine to road wheels; (viii) road wheels, they finally drive the vehicle.

18. The method according to claim 14, further comprising a method of estimating the optimal injection pressure $P_1$ of compression of the first and the second components of the working fluid, the optimal temperature $T_y$ of the combined mixture and the supercritical temperature $T_1$ (injection temperature) to which the combined mixture should rise from $T_y$ through absorption of thermal energy from the ambience in the heat exchanger (vi), as to obtain optimal external work after the combined working fluid at $P_1$ and $T_1$ undergoes turbo-expansion to a pressure $P_2$ (which can be 1 bar or less), the thermodynamic state parameters $P_1$, $T_1$ and $P_2$ being selected so as to regenerate the first and the second component of the working fluid in the same initial amounts so that the engine can run in closed cycle with a fixed amount of the working fluid.

19. The method according to claim 14, further comprising estimating the second component (x) of the working fluid and the content (1–x) of the first component of the working fluid to ensure that the liquid content (1–x) is sufficient to cool the second component of the working fluid while the latter is being compressed to the supercritical (injection) pressure $P_1$ in the polytropic compressor, the cooling being necessary for reducing the input compression work significantly below the work output generated by the turbine expansion.

20. The method according to claim 1, further comprising a heat engine that does not reject any heat portion from the heat source (1) to the surroundings (2) (both (1) and (2) being the ambient thermal environment), wherein the said heat is reabsorbed by the first component of the working fluid in the cycle.

\*     \*     \*     \*     \*